United States Patent [19]

Phillips

[11] 4,351,026
[45] Sep. 21, 1982

[54] PROJECTILE LOCATING APPARATUS FOR USE IN TARGET SHOOTING

[75] Inventor: Robert B. Phillips, Walton on Thames, England

[73] Assignee: Australasian Training Aids (Pty.) Limited, Albury, Australia

[21] Appl. No.: 148,570

[22] Filed: May 9, 1980

Related U.S. Application Data

[63] Continuation-in-part of Ser. No. 131,086, Mar. 17, 1980, abandoned.

[30] Foreign Application Priority Data

May 10, 1979 [GB] United Kingdom ............... 7916217

[51] Int. Cl.³ .......................... F41J 5/12; G06F 15/20
[52] U.S. Cl. .................................. 364/423; 235/400; 273/372; 367/127; 367/906
[58] Field of Search ............... 364/423, 410, 561, 460; 273/371, 372; 367/108, 127, 129, 906; 340/323 R; 35/25; 235/400

[56] References Cited

U.S. PATENT DOCUMENTS

| | | | |
|---|---|---|---|
| 2,535,255 | 12/1950 | Barnes et al. | 367/127 |
| 2,916,289 | 12/1959 | Zito | 273/372 |
| 2,925,582 | 2/1960 | Mattei et al. | 367/128 |
| 3,022,076 | 2/1962 | Zito | 273/372 |
| 3,489,413 | 1/1970 | Groder et al. | 273/372 |
| 3,627,323 | 12/1971 | Bozich | 273/372 |
| 3,678,495 | 7/1972 | Gilbert | 273/372 |
| 3,707,699 | 12/1972 | Sanctuary | 367/127 |
| 3,778,059 | 12/1973 | Rohrbaugh et al. | 273/372 |
| 3,857,022 | 12/1974 | Rebane et al. | 367/117 |
| 3,985,024 | 10/1976 | Horak | 364/507 |

FOREIGN PATENT DOCUMENTS

| | | | |
|---|---|---|---|
| 2807101 | 8/1978 | Fed. Rep. of Germany . | |
| 969926 | 9/1964 | United Kingdom . | |
| 1553251 | 9/1979 | United Kingdom | 367/906 |

*Primary Examiner*—Mark E. Nusbaum
*Assistant Examiner*—Gary Chin
*Attorney, Agent, or Firm*—Schwartz, Jeffery, Schwaab, Mack, Blumenthal & Koch

[57] ABSTRACT

A curved, elongate transducer assembly contacted by a shock or pressure wave transmits the resultant vibrations to the ends of the member, the vibrations at the respective ends being converted to output signals from which a time difference signal is produced. A computer calculates from the time difference signal the inclination angle of the projectile trajectory relative to a reference line. Two of the curved, elongate transducer assemblies at spaced locations permit calculation of two such inclination angles and, therefrom, the location at which the projectile trajectory passes through a reference plane. The transducer assembly may be a rigid bar with transducer elements at each end, or a single piezoelectric member with pickup electrodes at each end. Two transducer assemblies may be housed in a lower portion of a framework covered with a target sheet of penetrable material to form a chamber, in which case the location at which the trajectory of a subsonic projectile passes through the target sheet may be determined.

59 Claims, 13 Drawing Figures

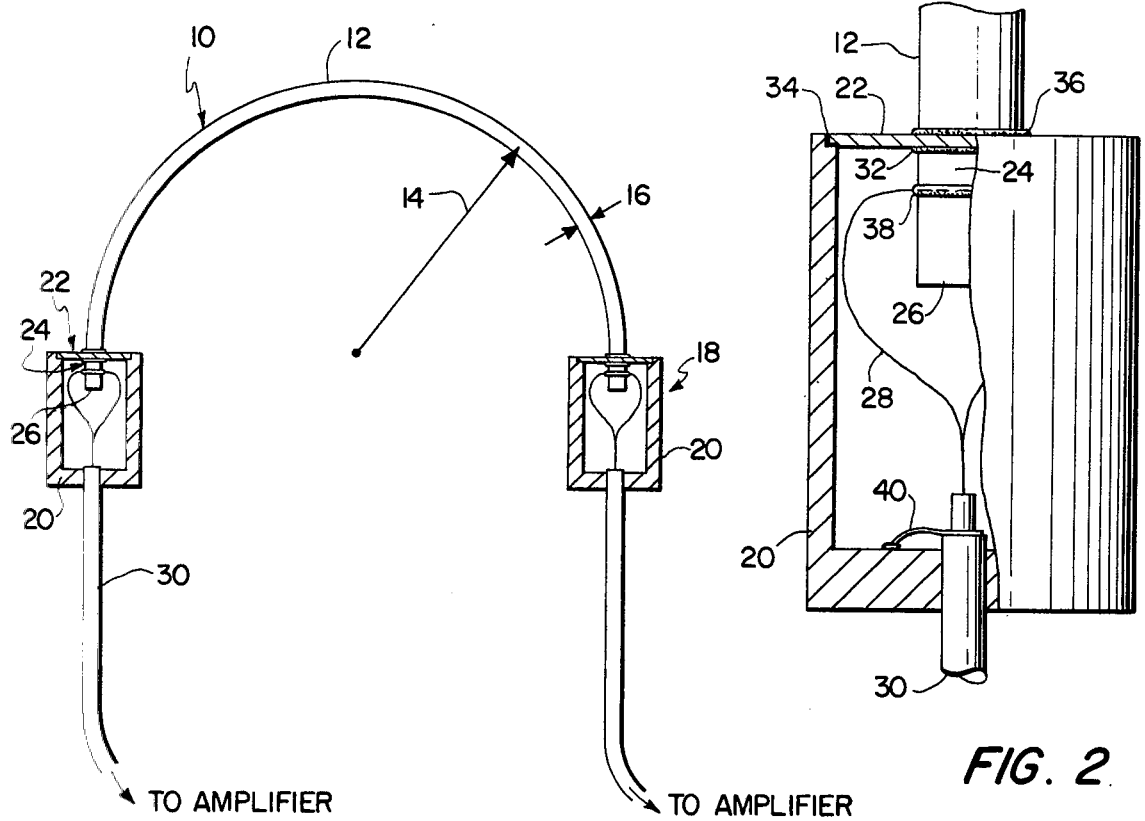
FIG. 1
FIG. 2
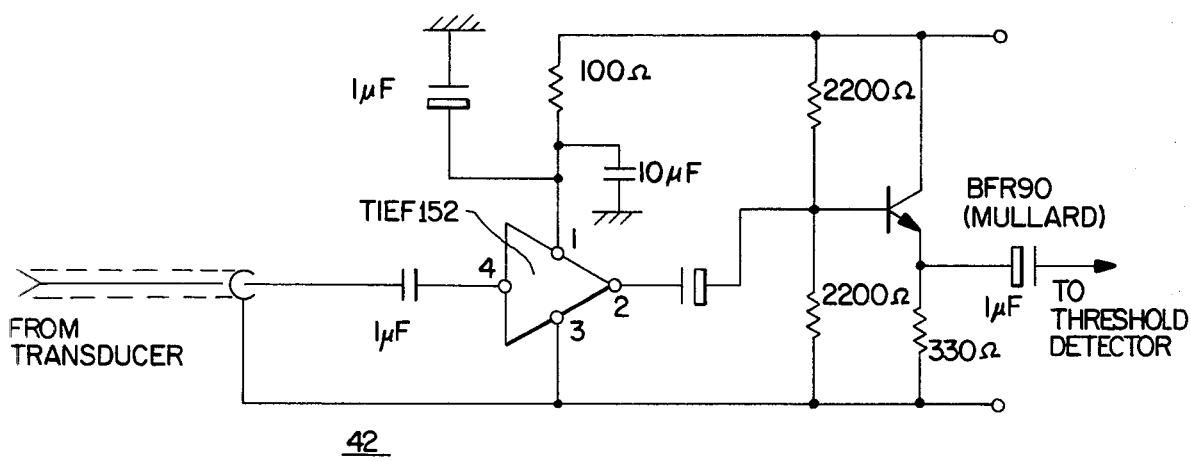
FIG. 3

PROJECTILE LOCATING APPARATUS FOR USE IN TARGET SHOOTING

PRIOR APPLICATION DATA

This application is a continuation-in-part of my co-pending application Ser. No. 131,086, filed Mar. 17, 1980 now abandoned.

BACKGROUND OF THE INVENTION

1. Field of the Invention

The invention relates to apparatus for determining the location of passage of a projectile through a predetermined plane, from the shock or pressure waves produced by the projectile.

2. The Prior Art

A number of systems are known for determining the location at which a projectile passes through or strikes a predetermined plane.

For example, U.S. Pat. No. 3,022,076 to ZITO, teaches a system in which a projectile strikes the rigid surface of a target to generate shock waves which emanate from the point of impact on the target. Detectors are mounted near the edge of two or more sides of the target surface, and produce output signals in response to shock waves. By measuring the time differentials of the detector outputs, the exact location of the point of impact may be determined by converting the time relationships into distance measurements.

British Pat. No. 969,929, published Sept. 16, 1964, also teaches a target having transducers mounted at the edges of a rigid target material, the output of the transducer indicating impact by a projectile. A similar system is taught in U.S. Pat. No. 3,857,022 to REBANE et al, in which transducers attached to three sides of a screen convert acoustic signals into electric signals from which the X, Y coordinates of the point of impact may be determined. Further, comparable systems of this type are taught in U.S. Pat. No. 3,627,323 to BOZICH et al, and U.S. Pat. No. 3,707,699 to SANCTUARY.

The U.S. Pat. No. 3,678,495 to GILBERT discloses a target system in which transducers are spaced evenly around a rigid metal target. Acoustic waves developed in the target upon impact of a projectile are detected by transducers. The output of the transducers enables computation of the location of the point of impact.

Systems of the type described above have a number of disadvantages for use in marksmanship training. All detect shock waves transmitted through a rigid target member and, when such a member is used in marksmanship training with live ammunition, the target member must be frequently replaced or repaired. Those systems which do not require transducers along more than one edge of the target area, such as in U.K. Pat. No. 969,929, are not particularly accurate, since they can only indicate that a projectile has struck a given target area and cannot indicate the precise location of the point of impact. Those systems which can determine the point of impact require transducers to be positioned along at least two edges of the target area. This presents a problem when using live ammunition on a firing range because transducers positioned along the side or top edges of the target surface may be struck by the ammunition, causing damage to the target system.

Airborne shockwaves are detected by other types of systems. For example, U.S. Pat. No. 2,535,255 to BARNES et al, teaches a system for locating the source of sound waves, in which two microphones are spaced apart along a base line. The time interval between arrival of sound at the microphones is detected and, from that, partial information about the origin of the sound source may be derived.

U.S. Pat. No. 3,489,413 to GRODER et al, teaches a system in which a plurality of bi-directional transducers is arranged to monitor target zones and to indicate through which zone a projectile has passed.

U.S. Pat. No. 2,925,582 to MATTEI et al, teaches a target system in which microphones are placed on a circular crown around the target. The transducer output signals are employed to deflect the beam of a cathode ray tube to indicate the location at which the projectile passes through the target plane.

U.S. Pat. No. 3,985,024 to HORAK, discloses a further transducer array for determining the location of an acoustic source.

U.S. Pat. No. 3,778,059 to ROHRBAUGH et al, discloses further an automatic target system responsive to the airborne acoustic shock wave produced by a projectile. Mutually perpendicular elongated acoustic energy conductors are located adjacent the perimeter of the target and have one or more acoustic transducers attached to an end or ends thereof. Electrical signals are produced by the acoustic transducers in response to detected shock waves, and appropriate circuitry determines the location of each "hit" on the target in rectangular coordinates.

As with the target systems which detect target-transmitted shock waves, the systems detecting airborne shock waves also generally require transducers to be spaced apart in an array which is not easily protectable in a target range. It would be preferable to have a system in which the transducers, or detectors, are located only along the bottom edge of the target, where they may be easily protected by means of an earth embankment or the like. Transducers, or detectors, positioned along the side or top edges of the target plane are not desirable due to the likelihood of damage being caused by badly aimed rounds.

SUMMARY OF THE INVENTION

The present invention concerns projectile locating apparatus, more particularly apparatus for detecting the location in a reference plane through which the trajectory of a projectile, such as a bullet, passes.

The present invention provides apparatus for determining the angle of inclination of the trajectory of a bullet in a predetermined plane relative to a predetermined point on a reference line in the plane. The apparatus of the present invention can be employed in a firing range for traning marksmen, the apparatus indicating the position at which a bullet passes through a predetermined target plane. Transducers need be positioned only along a single edge of the target plane, and are therefore easily shielded from damage by stray bullets.

According to a broad aspect of the invention, a vibration transmitting member presents a substantially convex surface to the airborne pressure or shock wave generated by a supersonic projectile. Transducers located at each end of the convex surface of the transmitting member generate respective electrical signals in response to vibrations transmitted thereto by the vibration transmitting member. A timing circuit measures the time difference between the instants of generation of the electrical signals.

The vibration transmitting member is preferably a rod or elongate member bent or formed in an arc, the arc being of constant radius and extending over a quarter- or semi-circle. The transducers preferably comprise piezoelectric elements suitably connected to provide respective output signals. In one preferred embodment, each piezoelectric element is secured to an interior end wall surface of a metal housing. The exterior end wall surface of the housing is secured to the vibration transmitting member end, so that the shock or pressure waves are transmitted to the piezoelectric element. In another form, the vibration transmitting member is a curved, elongate member of piezoelectric material having a pair of conductive pickup electrodes at each end, each pair of electrodes providing a transducer output signal.

The transducer output signals are provided to respective amplifiers, and then to threshold detectors. The threshold detector outputs are connected to a timing circuit which measures the time difference between the instants of arrival of vibrations at the ends of the vibration transmitting member. In a preferred form, the timing circuit has two counters, one associated with each transducer or electrode pair. The counter associated with the transducer or electrode pair which first receives a vibration begins counting when the first transducer or electrode pair receives the vibration and stops counting when the second transducer or electrode pair receives the vibration. The counter counts output pulses from a clock signal generator.

A calculating circuit or programmed computer determines from the resultant clock count the angle of inclination of the origin of the vibration detected, relative to a predetermined point on a reference line in the target plane. Two detectors, each having a vibration transmitting member and associated transducers or pickup electrodes for providing output signals, may be provided at spaced-apart locations in a common plane, the calculating circuit or programmed computer being operative to determine the location in the reference plane of the source of the projectile-generated shock or pressure wave which causes the vibrations.

In one preferred form of the invention, the two detectors, each with a vibration transmitting member and associated transducers or pickup electrodes, are located in respective lower corners of a chamber defined by a framework covered with a sheet of material penetrable by the projectile. With this arrangement, it is not necessary for the projectile to be travelling at supersonic velocity; the projectile generates a pressure wave within the chamber which expands radially outwardly from the projectile trajectory and which is detectable by the detectors.

Additional features of the present invention will become apparent to those skilled in the art in view of the detailed description of the preferred embodiments which follow with reference to the accompanying drawings.

BRIEF DESCRIPTION OF THE DRAWINGS

FIG. 1 shows in partial elevational view a single shock or pressure wave detector in accordance with the present invention;

FIG. 2 is an enlarged cut-away view of a part of the shock or pressure wave detector of FIG. 1;

FIG. 3 shows a circuit diagram for an amplifier suitable for use with the detector of FIGS. 1 and 2;

THE PREFERRED EMBODIMENTS

Figure 4:
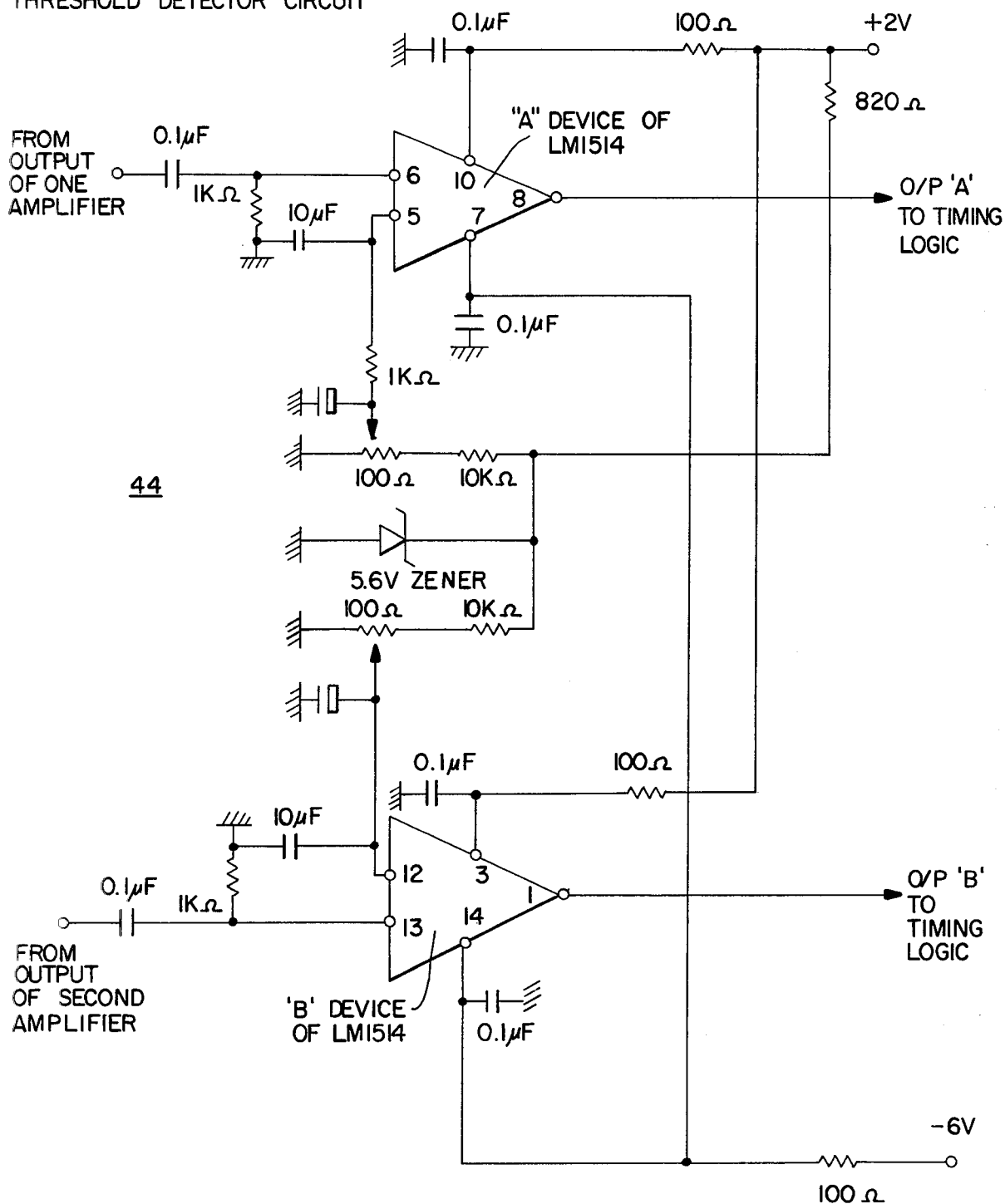
FIG. 4 shows a circuit diagram of a threshold detector circuit suitable for use with the shock or pressure wave detector of FIGS. 1 and 2.

A supersonic projectile, such as a bullet, propagates a conical or substantially conical shock or pressure wave as it passes through the atmosphere, the apex of the shock wave being adjacent the front of the supersonic projectile and the axis of symmetry of the conical pressure or shock wave closely corresponding to the trajectory of the supersonic projectile. The term "shock wave" as used herein is intended to means a pressure or shock wave of this type.

Deceleration of the projectile as it passes along its trajectory, acceleration of the projectile downwardly as a result of the effect of gravity, and the movement of the air through which the projectile is passing (i.e., wind) may affect the propagation of the shock wave somewhat. However, with regard to the degree of accuracy attained by the present invention, it is not necessary to consider the effects of deceleration, wind, or gravity.

The present invention concerns apparatus for locating a point on the trajectory of projectile, for example, in target shooting. While it is preferred that projectiles attaining supersonic velocity be used with the apparatus, at least one form of the invention operates effectively with sub-sonic projectiles by detecting a pressure wave within a chamber caused by penetration of the projectile through a wall of the chamber, as will be explained in greater detail below.

FIG. 1 shows generally a shock or pressure wave detector 10 in accordance with the present invention. Detector 10 preferably comprises a curved bar 12 of uniform circular cross section 16, the cross section being preferably about ¼ inch. Bar 12 is curved with a regular radius of curvature 14, the curvature radius being about 3 inches in a preferred form of the invention. Bar 12 is constructed of a material which readily transmits vibrations along its length at a velocity greater than the propagation velocity of a shock wave in air. The bar is especially transmissive of mechanical pressure pulses having a short rise time, such as those induced in the bar by the shock or pressure wave from a passing projectile. In a preferred embodiment of the invention, curved bar 12 is made of cured epoxy resin such as MY 750 resin mixed with MY 753 hardener, available from CIBA (ARL) Ltd. of Duxford, Cambridge, England. This material has been found to have good mechanical vibration transmission properties and provides relatively higher output signals than other materials when used in conjunction with the preferred transducer assembly.

As shown in FIG. 1, a transducer assembly 18 is mechanically coupled to each end of curved bar 12 for converting mechanical pressure pulses within the bar into corresponding electrical signals. Each transducer assembly 18 comprises a disc-shaped ceramic piezoelectric element 24, such as type MB 1043, available from Mullard Company Ltd. of Mullard House, Torrington Place, London, England. Each piezoelectric element 24 is secured to the center of a circular end wall 22 of a machined aluminum housing 20 with a thin coating of electrically-conductive epoxy resin 32, such as "E-Solder" E-3021, available from CIBA GIEGY (PTY.) Ltd. of Orion Rd., Lane Cove, Sydney, Australia. The corresponding outer face of housing end wall 22 is bonded to one end of curved bar 12 with a thin layer 36 of the same epoxy resin of which curved bar 12 is made. Vibrations induced in curved bar 12 by the shock or pressure wave from a passing projectile are transmitted through end wall 22 and resin layer 32 to the piezoelectric element 24.

The structure of the transducer assembly is shown in enlarged, partially cut-away view in FIG. 2. To enhance the transducer output, there may be bonded or otherwise secured to the rear face of disc-shaped piezoelectric element 24 a section of a rod of ceramic material 26, having the same diameter as the disc-shaped piezoelectric element 24. Rod 26 preferably has the same chemical and physical composition as the piezoelectric element, but is preferably manufactured by a modified process so as to have no significant piezoelectric properties itself. Alternatively, rod 26 can be replaced by a number of piezoelectric elements, of the same type as element 24, bonded together with thin layers of epoxy resin to form a stack of appropriate length. Rod 26, whether a ceramic member or a stack of piezoelectric elements, has a length which is more than twice the thickness of the piezoelectric element 24. Thus, rod 26 acts as a stub waveguide so that vibrations passing through piezoelectric element 24 and reflected from the free end of rod 26 back to piezoelectric element 24 do not arrive until well after piezoelectric element 24 has completed its initial response to the first part of a short rise time pulse in order to provide an output signal of considerable magnitude. Rod 26 is preferably bonded to element 24 with an electrically-conductive epoxy resin, such as "E-Solder" type E-3021, and portions of this conductive adhesive material protrude slightly around the sides of the interface between the mating surfaces of element 24 and rod 26, as shown at 38 in FIG. 2. A small-diameter conductive wire 28 is embedded in this protruding portion of the conductive adhesive material 38, and wire 28 is further connected to the center lead of a coaxial cable 30. The shield portion 40 of the coaxial cable is mechanically and electrically bonded to aluminum housing 20 by suitable means.

It will be appreciated that when a projectile-generated shock or pressure wave impinges on curved bar 12, vibrations generated in the bar will be transmitted to transducers 18, causing a potential difference between the opposing faces of each piezoelectric element 24. One face of each element 24 is bonded by a conductive adhesive layer 32 to aluminum housing end wall 22, which in turn is bonded by a layer 34 of such conductive adhesive to the main portion of the aluminum housing 20. Housing 20 is, in turn, electrically connected to the shield 40 of coaxial cable 30. The other face of element 24 is bonded by a conductive resin 38 to wire 28 which is connected to the center lead of the coaxial cable 30. Thus, vibrations in the bar will result in generation of signals from transducer assemblies 18 which appear on the respective coaxial cables 30.

Coaxial cables 30 lead from respective transducers 18 to wide-band high-gain amplifiers 42, as shown in FIG. 3. It will be understood that any suitable amplifier of this type may be used, but the circuit of FIG. 3 represents a preferred embodiment. The integrated circuit amplifier is of type TI EF 152, available from Texas Instruments Inc., P. O. Box 5012, Dallas, Tex., U.S.A. It is well known that the output voltage of the type of amplifier illustrated in FIG. 3 at any particular instant in time is directly related to the input current at that time. The input/output relationship of the amplifier can be approximated by the mathematical expression $$V_{out}(t) = RF \cdot I_{in}(t) \quad \text{(Equation 1)}$$

Where $V_{out}$ is the output voltage at any instant of time, $I_{in}$ is the input current at any instant of time, and RF is a constant of proportionality.

The response of a piezoelectric element can be approximately defined as $$Q_o(t) = K_1 S_1(t) \quad \text{(Equation 2)}$$

Where $Q_o$ is the instantaneous charge imbalance within the element as a function of time, $K_1$ is a constant or proportionality, $S_1$ is the mechanical strain applied to the piezoelectric element, varying with time and integrated over the volume of the element, and t is the independent variable of time.

When the piezoelectric element is coupled to an amplifier of the preferred type shown in FIG. 3, it is known that the current flow into the amplifier will be given by the expression $$Q_o(t) = \int_{-\infty}^{t} I(t)\, dt \quad \text{(Equation 3)}$$

or $$I(t) = \frac{d\, Q_o(t)}{dt} \quad \text{(Equation 4)}$$

Combining equations 1, 2, and 4

$$V_o(t) = RF \cdot \frac{d}{dt}(K_1 S_1(t)) \quad \text{(Equation 5)}$$

or

-continued $$V_o(t) = K_2 \cdot \frac{d}{dt} S_1(t) \quad \text{(Equation 6)}$$

Where $K_2$ is a new constant of proportionality equal to $RFK_1$. Thus, the output voltage is proportional to the instantaneous rate of change of net strain in piezoelectric element 24.

If a piezoelectric device is subjected to a relatively low-frequency vibration, the rate of change in applied strain at any particular instant of time is relatively low and, thus, the output voltage of the transducer will be low. However, if the transducer is subjected to a high-frequency vibration, the output voltage is relatively high because the instantaneous rate of change in applied strain is high. In the detector arrangement of FIG. 1, a high-amplitude signal is generated by each piezoelectric element 24 in response to a high-frequency strain applied to the transducer as a result of vibrations in curved bar 12 induced by the shock or pressure wave from a passing projectile. The detector arrangement described with reference to FIGS. 1 and 2 therefore facilitates dection of the shock or pressure wave generated by a passing projectile and inherently discriminates against low-frequency vibrations which may be induced in curved bar 12 as a result of wind or other factors.

FIG. 4 illustrates a preferred threshold detector circuit for providing logic output signals in response to amplified output signals of the transducers associated with the shock or pressure wave detector arrangement shown in FIG. 1. The threshold detector circuit has two inputs, each coupled to the output of an amplifier (as in FIG. 3) which in turn is coupled at its input to a respective transducer. The threshold detector circuit 44 preferably comprises an integrated circuit type LM 1514, available from National Semiconductor Limited, Bedford, United Kingdom. The integrated circuit has two differential input comparators "A" and "B". The amplified output signal of a first transducer is supplied through an appropriate coupling capacitor to input terminal 6 of comparator "A", and a reference voltage is provided to a second input terminal 5. This reference voltage is appropriately set by adjustment of the associated 100 ohm potentiometer. The reference voltage is preferably controlled by means of a Zener diode, as shown.

The amplified output signal of the second transducer associated with curved bar 12 is provided through an appropriate coupling capacitor to input terminal 13 of comparator "B". A reference voltage determined by adjustment of the associated 100 ohm potentiometer is supplied to input terminal 12 of comparator "B". The output of comparator "A" is at a logic "high" level in the quiescent state, but quickly changes to a "low" logic level when an output signal above a predetermined threshold level is received from the associated transducer. The output of comparator "B" is at a logic "high" level in the quiescent state, and quickly changes to a logic "low" level in response to a signal above the preset threshold from the associated transducer.

Thus, two logic output signals are provided by the threshold detector circuit 44, each signal representing the time at which a shock or pressure wave is detected by the corresponding transducer. One threshold detector circuit 44 as shown in FIG. 4 is required for each shock wave detector arrangement of FIG. 1.

Figure 5:
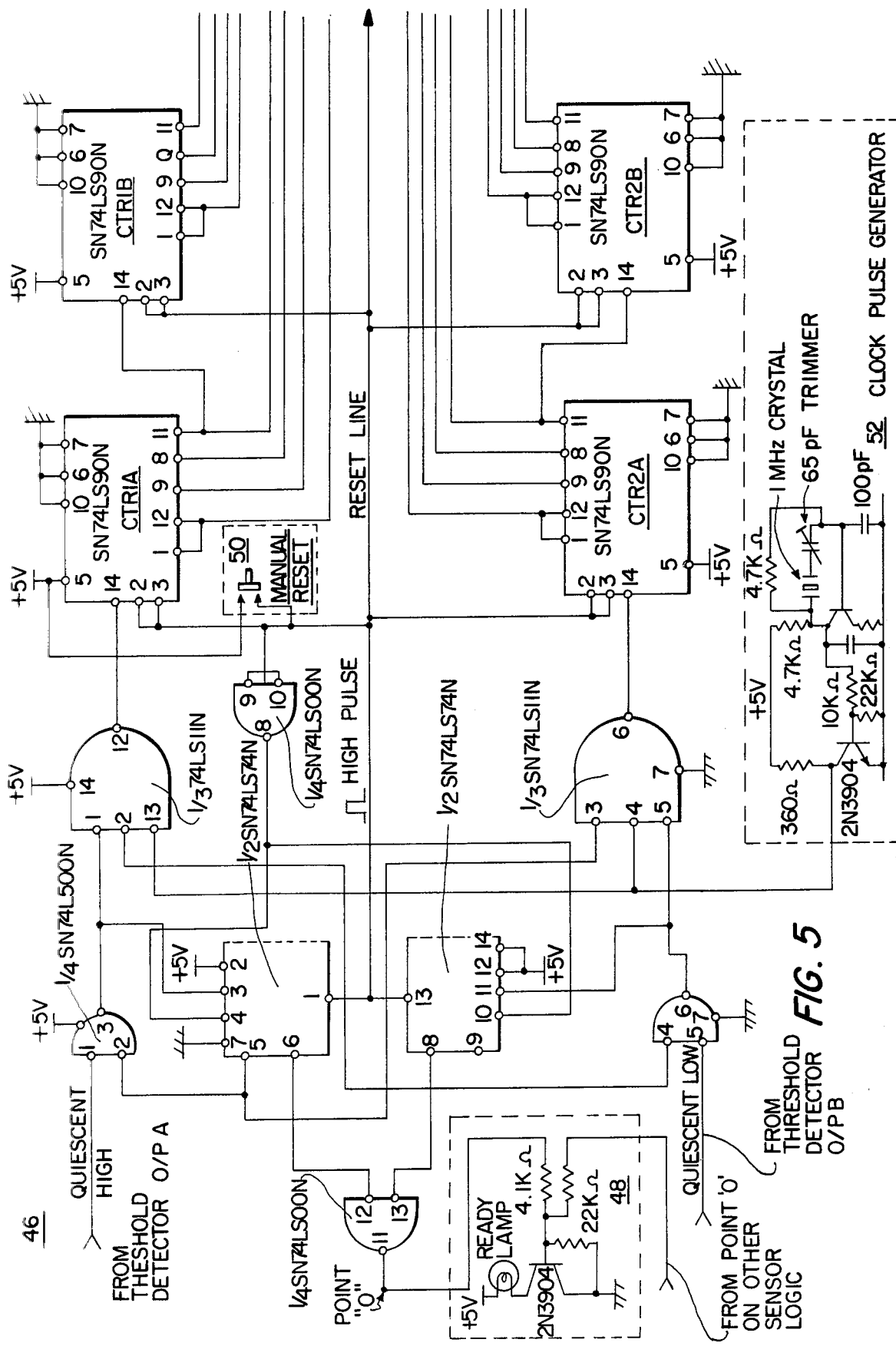
FIG. 5 is a timing logic circuit diagram for determining the time difference between output signals of the shock or pressure wave detector transducers of FIGS. 1 and 2.

The logic output signals of comparators "A" and "B" of threshold detector circuit 44 are provided to respective inputs of a timing logic circuit 46 as shown in FIG. 5. Timing logic circuit 46 is coupled to a clock pulse generator circuit 52 which supplies clock pulses at a constant, known frequency. When, for example, the output of threshold detector comparator "A" changes state to indicate that the associated transducer has detected a shock or pressure wave, counters CTR 1A and CTR 1B are activated to begin counting fixed-interval pulses from clock pulse generator 52. The counting proceeds until the output of threshold detector comparator "B" changes state, and then the counting is stopped. The number of clock pulse intervals counted by counters CTR 1A and CTR 1B represents the time difference between the instants of detection of a given shock or pressure wave by the two transducers associated with curved bar 12.

Similarly, if the output of threshold detector comparator "B" is first to change state, counters CTR 2A and CTR 2B begin to count clock pulses and continue counting until the output of threshold detector comparator "A" changes state. The number of clock pulse intervals counted by counters CTR 2A and CTR 2B represent the time difference between instants of detection of a shock wave by the two transducers associated with curved bar 12. Counters CTR 1A, CTR 1B, CTR 2A, and CTR 2B preferably each comprise an integrated circuit of type SN74LS90N, available from Texas Instruments, Inc.

Timing logic circuit 46 includes a pair of bistable multivibrators which ensure that, after the first time each threshold detector comparator changes state, the timing logic circuit will respond correctly during counting, despite subsequent changing of the threshold detector output states. The bistable multivibrators are reset by depressing manual reset switch 50. Thus, only the leading edge of a shock or pressure wave is detected, and output signals generated by the transducers in response to successive wave fronts of the shock or pressure wave are ignored by the timing logic circuit. The bistable multivibrators preferably comprise an integrated circuit of type SN74LS74N, available from Texas Instruments, Inc. Preferably, a "ready" lamp circuit 48 is also coupled to the timing logic circuit 46, which illuminates to indicate when the bistable multivibrators have been reset, that is, when the timing logic circuit is ready to determine a new time difference between the instants of shock or pressure wave detection by the transducers, and which extinguishes when a projectile is detected to indicate that data is ready for processing.

Ready lamp circuit 48 is coupled to the bistable multivibrators through a gate, comprising one fourth of an integrated circuit of type SN74LS00N. The output of this gate, at point "0", changes from a logic "high" state to a logic "low" state when counters CTR 1A and CTR 1B or counters CTR 2A and CTR 2B contain a count representing, in binary form, the number of clock pulse intervals which elapse between triggering of threshold detector comparator "A" and triggering of threshold detector "B".

The remaining integrated circuit components in FIG. 5 are indicated by type number, and are available from Texas Instruments, Inc. It will be understood that, although a manual reset switch 50 is shown in FIG. 5, suitable automatic reset may be provided in a manner which will be apparent to those skilled in the art. It will also be understood that timing logic circuit 46 is suitable for use with a single shock or pressure wave detector as shown in FIG. 1. If additional such shock or pressure wave detectors 10 are to be simultaneously employed, a respective timing logic circuit 46 must be supplied for each detector 18. However, only one each of the ready lamp circuit 48, manual reset switch 50, and clock pulse generator 52 need be employed, and the connection of these components to additional timing logic circuits 46 will be apparent to those skilled in the art.

Figure 6:
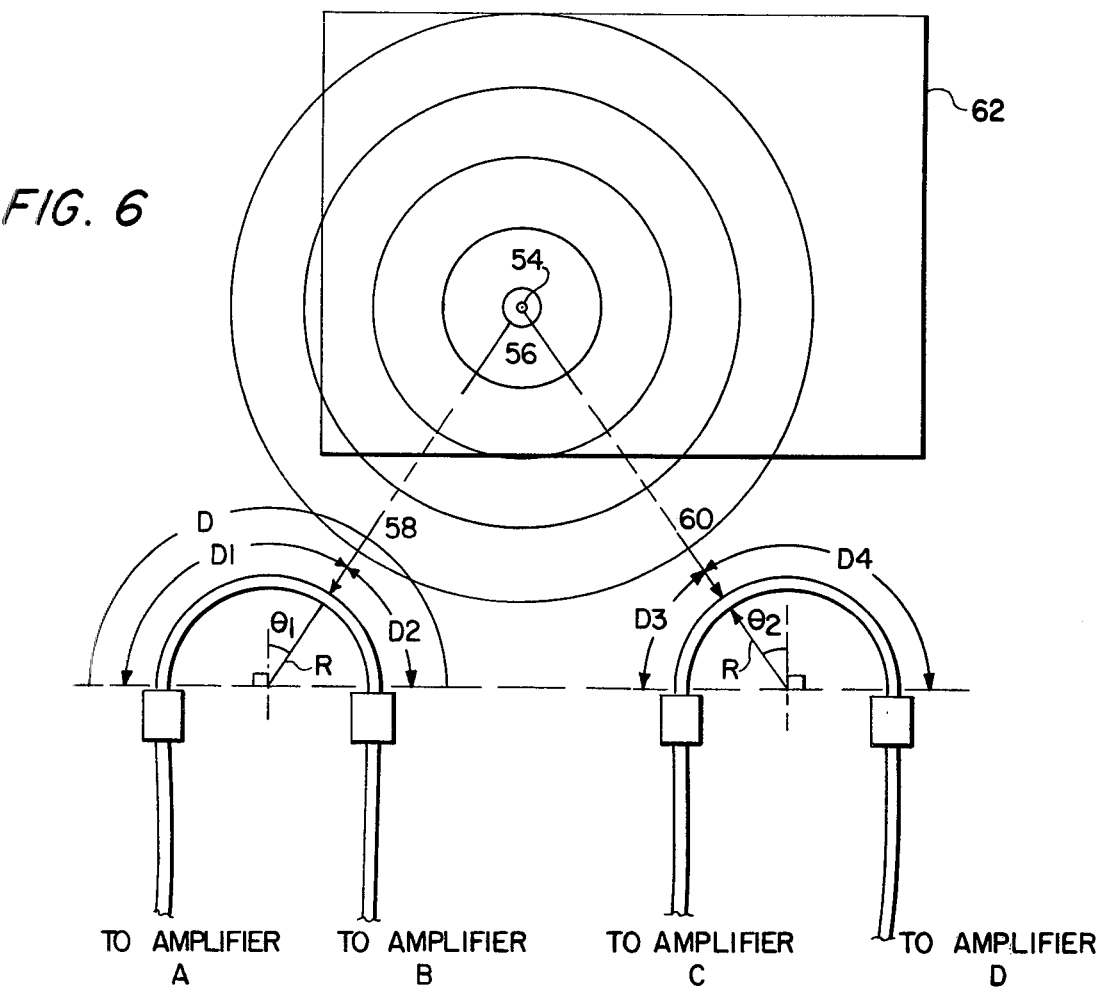
FIG. 6 shows an arrangement for determining the point at which a projectile passes through a target plane, employing two of the detectors according to FIG. 1.

FIG. 6 shows diagrammatically the manner in which the apparatus of the present invention may be used on a firing range. The firing range includes a target 62 which may be, for example, a planar sheet of plywood or cardboard erected in a vertical position and, optionally, having a target outline (not shown) marked thereon. A marksman (not shown) positions himself squarely in front of and at a distance from the target, preferably at a predetermined firing point. An earth embankment or other protective arrangement (not shown) is preferably provided in front of and beneath the target to prevent damage to the shock wave detectors from stray bullets. Behind the earth embankment, and lying in a plane parallel to the plane of the target, are two detectors 18 of the type shown in FIG. 1.

FIG. 6 shows schematically at 54 the point at which the trajectory of a supersonic bullet passes through the plane of the shock or pressure wave detectors. The shock wave generated by the bullet expands radially outwardly as indicated at 56. At a first point in time, the expanding shock wave contacts a first one of the detectors at point 58, the shock wave initially reaching the vibration transmitting bar of the detector at a tangent point which lies on a stright line joining point 54 and the center of the radius of curvature of the detector bar. The shock wave consequently generates vibrations within the bar which are propagated at a velocity greater than the velocity of sound wave propagation in air. Vibrations generated in the bar are transmitted therethrough to the transducers located at the respective ends of the bar. Transducer B will receive the vibrations before they are received by transducer A, and this time difference can be expressed mathematically. The time difference between the instants of initiation of electrical output signals from transducers B and A is given by $$T_{diff} = (D_1 - D_2)/V_p \qquad \text{(Equation 7)}$$

Where
 $T_{diff}$ = the difference between instants of initiation of signals from the transducers,
 $D_1$ = the path length traversed by the pressure pulse travelling counterclockwise through the bar to transducer A,
 $D_2$ = the path length traversed by the pressure pulse travelling clockwise through the bar to transducer B, and
 $v_p$ = the effective velocity of propagation of pressure pulses through the curved bar.

The outputs of transducers A and B are coupled through respective amplifiers to respective inputs of a threshold detector circuit 44 as shown in FIG. 4. The time difference between output signals from threshold detector 44 is detected by timing logic circuit 46, by counting clock generator pulses in counters CTR 2A and CTR 2B. Then $$C_T = T_{diff}/T_{clock} \qquad \text{(Equation 8)}$$

Where
 $C_T$ = total count on counters CTR 2A and CTR 2B,
 $T_{diff}$ = the difference already defined, and
 $T_{clock}$ = period of cycle of clock pulse generator 52.

Preferably, the curved bar of the shock wave detector is of constant radius, conforming to the arc of a circle. Accordingly, the following relationship can be established:

$$D_1 - D_2 = (\pi \cdot R)/90 \times \Theta_1 \qquad \text{(Equation 9)}$$

Where
 R = mean radius of curvature of the bar
 $\Theta_1$ = angle between reference axis (a line through the center of curvature of the bar normal to a line passing through the effective center of the transducers A and B) and a line passing through the center of curvature and normal to a tangent to the bar at the point of impingement by the shock wave.
 $\pi$ = fixed constant, approximately 3.1416

Combining equations 7, 8, and 9, $$\Theta_1 = 90/\pi \cdot C_T T_C V_p \qquad \text{(Equation 10)}$$

Since the clock pulse generator period $T_C$ and the velocity of propagation of shock waves in a bar $V_P$ are predetermined, angle $\Theta$ can be calculated.

Similarly, the expanding shock wave strikes the curved vibration transmitting member of the right-hand shock wave detector shown in FIG. 6 at a tangential point 60. Vibrations in the curved bar are transmitted to transducer C over a path length $D_3$ and to transducer D over a path length $D_4$. The outputs of transducers C and D are provided to respective amplifiers as shown in FIG. 3 and then to respective inputs of a threshold detector circuit 44 as shown in FIG. 4. The ouputs of the corresponding threshold detector circuit 44 are provided to a second timing logic circuit 46 of the type shown in FIG. 5. The counters associated with transducer C may be labelled CTR 3A and CTR 3B, respectively (corresponding to counters CTR 1A and CTR 1B in FIG. 5). Similarly, counters associated with transducers D may be labelled CTR 4A and CTR 4B, respectively (corresponding to counters CTR 2A and CTR 2B in FIG. 5).

It will be understood that since the detectors shown in FIG. 6 are positioned at predetermined locations along a common reference line in the reference, or target, plane, the point 54 through which the bullet passes may be determined by simple trigonometric calculation.

Figure 7:
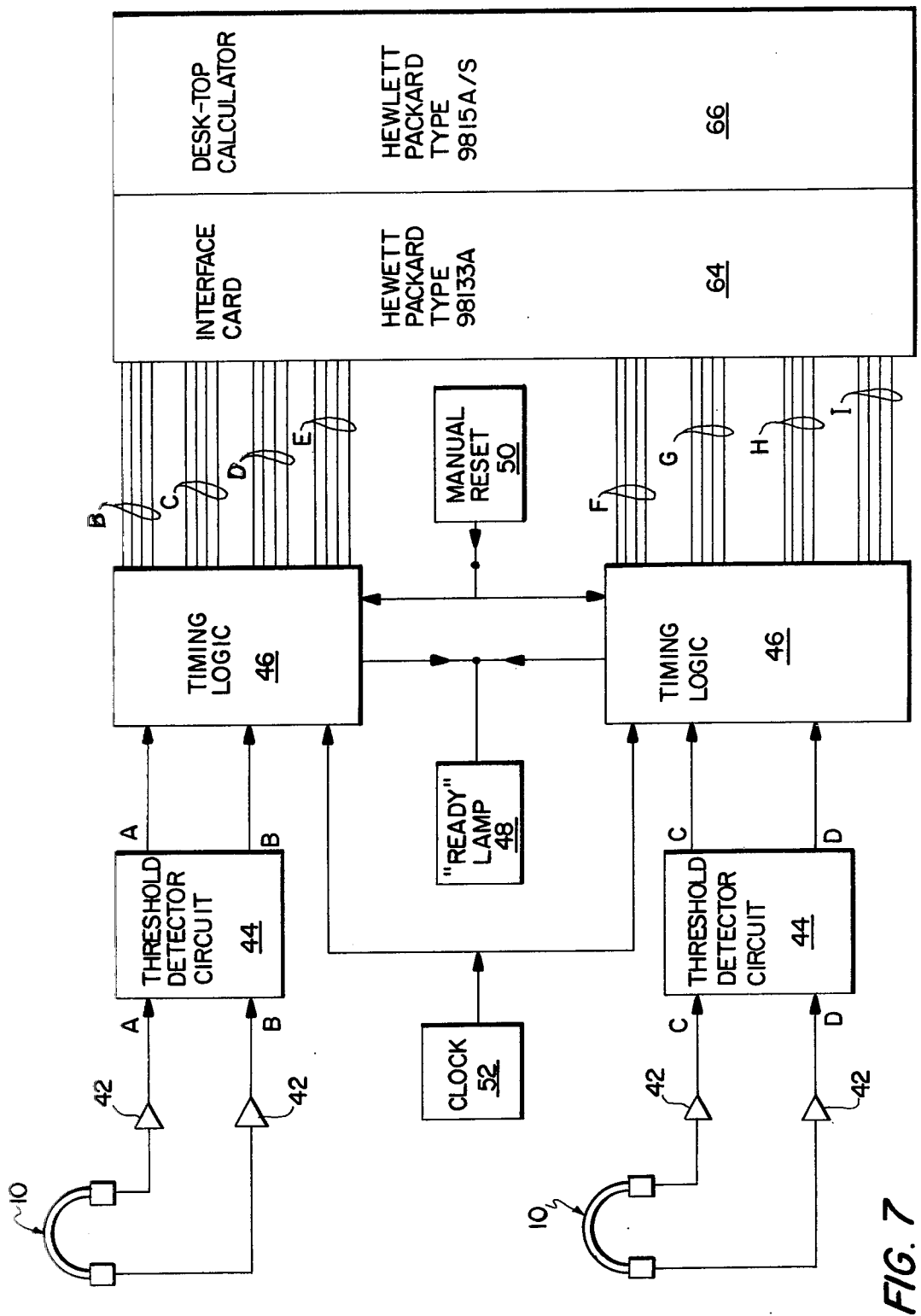
FIG. 7 is a block diagram of a complete apparatus in accordance with one form of the invention for determining the location of passage of a projectile through a predetermined plane.

FIG. 7 shows a block diagram of the overall system for determining angles $\Theta_1$ and $\Theta_2$ of FIG. 6, as well as the location of point 54 in the plane of the detectors through which the bullet trajectory passes. Shown in FIG. 7 are two of the shock or pressure wave detectors 10, which may be positioned relative to a target as shown in FIG. 6. The outputs of transducers A, B, C, and D are supplied through respective amplifiers 42 to threshold detector circuits 44, as indicated. The threshold detector circuits provide logic signals upon receipt of pulses from the transducers, as described above, to timing logic circuits 46. Timing logic circuit 46 associated with transducers A and B has counters CTR 1A, CTR 1B, CTR 2A, and CTR 2B, which provide in binary signal form on respective groups of four lines, B, C, D, E, the number of clock generator pulse intervals registered thereon. Similarly, timing logic circuit 46 associated with transducers C and D has counters CTR 3A, CTR 3B, CTR 4A and CTR 4B, which provide in binary signal form on respective groups of four lines F, G, H, I, the numbers of clock generator pulses registered thereon. The groups of output lines B, C, D, E, F, G, H, and I are connected to pins of an interface card, preferably of type 98133A, available from Hewlett-Packard. The connection of counter output pins to interface card pins is provided in the table of Appendix A. The interface card is plug-compatible with the Hewlett-Packard desk-top calculator type 9815A/S, which is programmed to calculate angles $\Theta_1$ and $\Theta_2$, as well as the X, Y coordinates of point 54 in the detector plane through which the bullet trajectory passes. The desk-top calculator is programmed by depression of keys on the calculator in the sequence given in Appendex A, which follows.

Figure 8:
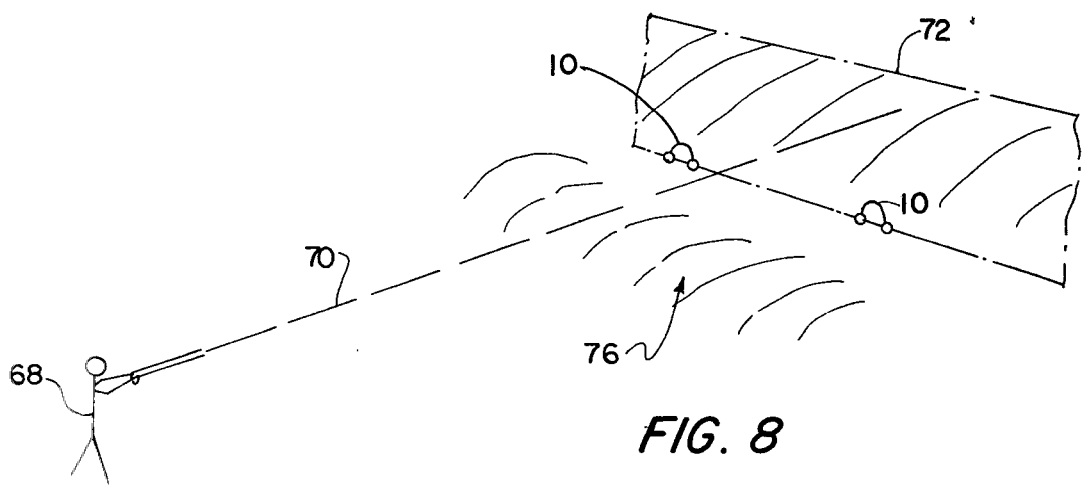
FIG. 8 shows a target equipped with two of the detectors shown in FIG. 1.

FIG. 8 of the accompanying drawings shows diagrammatically a marksman 68 firing a bullet along a trajectory 70 at a target (not shown) lying behind an imaginary vertical measurement plane 72. Detectors 10 are arranged along the bottom edge of the target area, lying substantially in the measurement plane. The marksman is located at a firing point predetermined such that the trajectory 70 of a bullet fired by the marksman is substantially normal to the measurement plane. A visible target (not shown) is preferably arrnged in or lying somewhat behind the measurement plane and substantially parallel thereto.

When a bullet is fired at the target by the marksman, the expanding shock or pressure wave generated by the bullet induces vibrations in the curved bars of detectors 10, these vibrations being transmitted to the transducers and operated upon as described above to determine the angle of inclination of the bullet trajectory through measurement plane 72 relative to each shock wave detector 10, as well as the point on measurement plane 72 through which the bullet trajectory passes.

In practice, a number of modifications can be made to the system as described above. For example, an earth embankment 76 may be provided in front of detectors 10 to prevent damage from badly aimed bullets. Further, the coordinates of the point on measurement plane 72 through which the bullet trajectory 70 passes can be simply printed out, as in the program of Appendix A, or can be further used to determine whether the bullet "hit" or "missed" a particular zone in target plane 72 and/or to allocate a "score" to the particular round fired. Such information may be displayed at a point near the trainee marksman or at any other suitable point, on appropriate apparatus such as a cathode-ray tube display. Further, the accuracy of the device can be increased by using three or more of detectors 10 to provide redundancy of measurement, and the program for the calculator can be modified accordingly.

The preferred desk-top calculator, type 9815A/S is manufactured by the Hewlett Packard Co., Inc., 5301 Stevens Creek Blvd., Santa Clara, Calif., U.S.A. This device is programmed by manual operation of its keyboard while in the "program" mode, and serves to automatically execute the sequence of operations defined by the key depressions when returned to the "run" mode. However, any other suitable calculating device having appropriate input/output interface devices and peripheral devices, such as graphic displays, may be used and appropriately programed.

It is to be understood that the shock wave detectors are preferably arranged along a common reference line in the measurement plane, as shown in FIG. 6 (for simplicity of calculation), but may be positioned on co-parallel or intersecting lines lying within the plane or may even be canted slightly out of the plane without substantial reduction in accuracy or increase in calculating effort.

Figure 9:
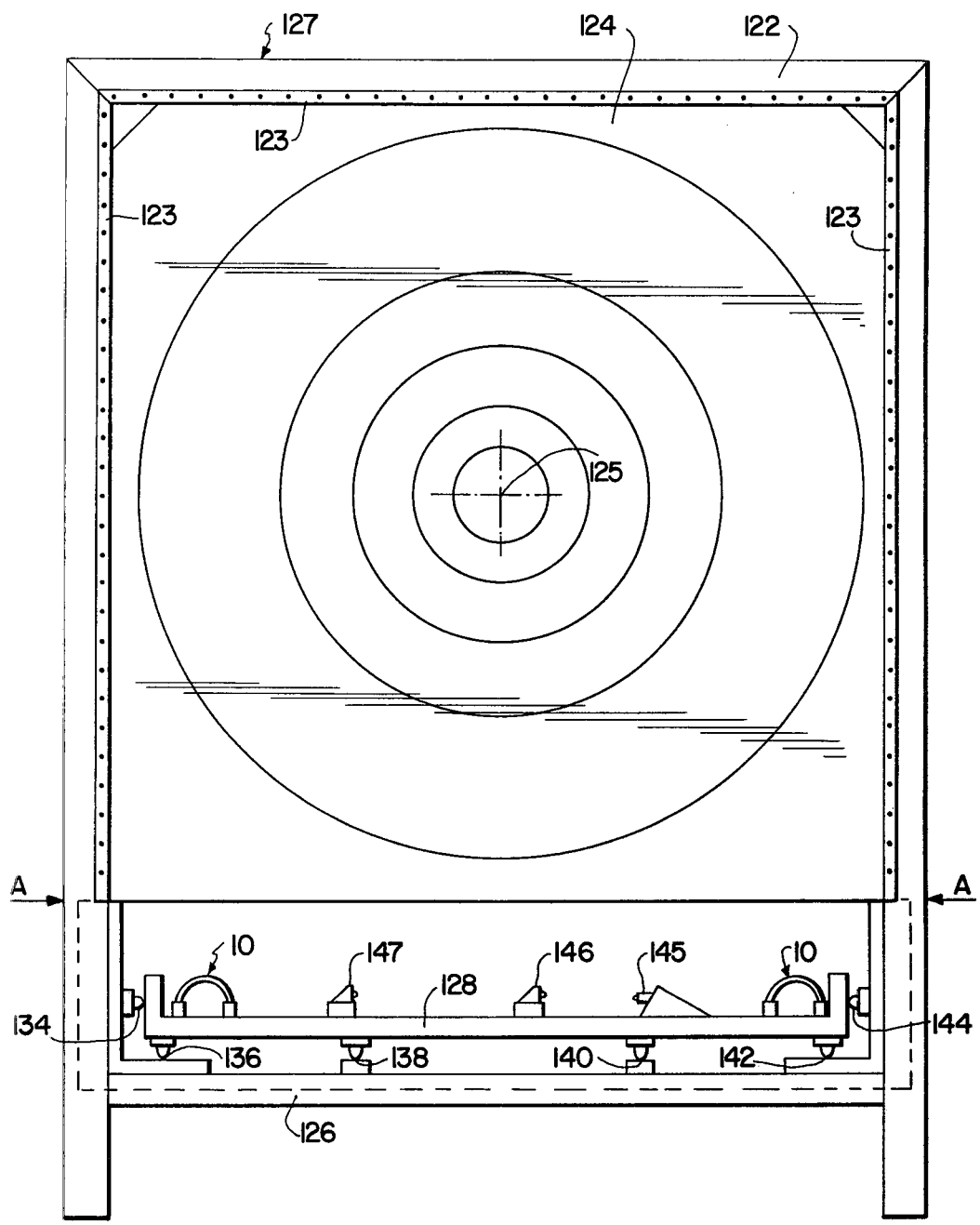
FIG. 9 shows a target framework covered with sheets of material to form a chamber, with pressure wave detectors in a lower region of the chamber.

FIG. 9 shows a target apparatus assembly in accordance with the invention, in front elevational view. The assembly includes a rigid rectangular frame 122 constructed preferably of hardwood, having an external width of, for example, about 2 meters. A flexible membrane 124 covers the front of target frame 122 down to line A—A, and a similar membrane (not show) covers the rear of target frame 122, defining a hollow chamber. A suitable material for the front and rear membranes is 3 mm thick "Linatex" available from Linatex Australia Ltd., Sinclair Rd., Dandong, Victoria, Australia. It will be understood, however, that other suitable materials may be used for the front and rear membranes, such as neoprene foam material, Plastazote, or other materials having suitable properties. Hardwood trapping strips 123 serve to retain the front and rear flexible membranes on the target frame. The lower section of frame 122 includes a cross-member 126 of hardwood. The lower interior portion of target frame 122 between cross-member 126 and line A—A is covered with 8 mm thick hardwood plywood, both front and rear, thereby defining a cavity for receiving the shock or pressure wave detectors 10 and other components.

A detector support beam 128 extends across the lower portion of the target chamber, and is mounted to the side members and cross-member 126 of target frame 122 by means of anti-vibration mountings 134-144. Suitable anti-vibration mountings 134-144 are, for example, Type No. E220240, manufactured by Barry Controls Inc., 700 Pleasant Street, Watertown, Mass., U.S.A.

Although the target arrangement of FIG. 9 may be constructed in any suitable dimension, it is contemplated that the outermost ring of the concentric rings forming a bull's-eye on the front membrane 124 of the target be nearly 2 m in diameter. A target of this size is suitable for target practice over a distance of approximately 500 m. In use, the target frame 121 is mounted, for example, behind a mantlet which shields the lower portion of the target assembly lying below line A—A in FIG. 9. Such mantlet may comprise an earthen embankment and/or concrete shield for preventing the detector support beam 128 and components mounted thereon from being damaged by bullets or other projectiles fired at the target.

Shown mounted on support beam 128 in FIG. 9, are an acoustic pulse source 145 and acoustic pulse sensors 146, 147, which may be employed for measuring the propagation velocity of sound in air within the target chamber, as will be explained in greater detail below.

Those skilled in the art will recognize that shock or pressure wave transducers 10 of the target arrangement in FIG. 9 may be connected, as shown in FIG. 7, to suitable apparatus for transducer output signal processing and calculation of X, 6 coordinates of the point at which the bullet trajectory passes through the target apparatus. These X, Y coordinates will, of course, be calculated in the plane of the detectors 10; if the detector planes is closely adjacent the front membrane 124 of the target assembly and/or if the bullet is fired along a trajectory which is substantially normal to the detector plane and front membrane 124 of the target assembly, the calculated X, Y coordinates will accurately indicate the location at which the bullet penetrated the front membrane 124.

It has been found in practice that, with the target assembly of FIG. 9, the bullet need not be travelling at supersonic velocity to obtain detector output signals from which X, Y coordinates can be calculated. The box-like target assembly of FIG. 9 will operate effectively with subsonic rounds as well, albeit with somewhat reduced, but still acceptable, accuracy. Subsonic projectiles passing through the target assembly generate a radially-expanding pressure wave within the target chamber which is not, strictly speaking, a "shock wave" as generated by a supersonic projectile, but which is nonetheless detectable by the detectors 10. It will thus be recognized that the box-like target apparatus permits calculation of the X, Y coordinates without sensitivity to bullet velocity.

The box-like target apparatus is also not sensitive to variations in the speed of sound propagation in air, as are some prior art target systems (for example, as disclosed in German Utility Model Application DE-GM No. 77 26 275, published Mar. 16, 1978). Although the target apparatus of FIG. 9, with detectors 10 connected as shown in FIG. 7, is capable of accurate position fixing without any speed of sound-in-air measurement, it is possible that the calculated "X" value (horizontal position) will show increasingly large errors in the lower region of the target. This is because the X, Y position coordinates are essentially derived from calculation of the intersection point of two lines which extend respectively from the detectors.

For low shot, larger "X" value errors are to be expected than for higher shot positions, as will be explained with reference to FIG. 10. It can be seen that a bullet whose trajectory intersects the X-Y measurement plane at a point 200 will have an elevation angle from the X-axis of $\Theta_1$ for detector 10 and of $\Theta_2$ for detector 10'. An error in determining angle $\theta_2$, such as elevation angle error $\Delta\theta_2$ (shown exaggerated for clarity), will result in an error $\Delta X_1$ in the calculated horizontal, or "$X_1$" value of point 200. However, for a bullet whose trajectory intersects the X-Y measurement plane at a much lower point 202, the same elevation angle error $\Delta\theta_2$ will result in an error $\Delta X_2$ in the calculated horizontal, or "$X_1$" value of point 202. It can be seen that $\Delta X_2$ is greater than $\Delta X_1$, for the same elevation angle error $\Delta\theta_2$.

This error can be largely compensated by measuring the difference in time of arrival of the shock- or pressure-wave-induced vibrations detected at the inner transducers "B" and "C" of the detectors 10, 10' and calculating from this time difference the "X" value of the shot position. This calculation does require at least an estimated value for the velocity of sound propagation in air, however, Assuming the "Y" value has already been calculated, the "X" value is given by $$V_S \Delta t = \sqrt{Y^2 + (X + d/2)^2} - \sqrt{Y^2 + (d/2 - X)^2} \quad \text{(Equation 11)}$$

Equation 11 is solved for X, e.g., by iteration.

Alternatively, if $Y << d/2$, where "d" is the spacing between detectors, then $$V_S \Delta t \approx \sqrt{(X - d/2)^2} - \sqrt{(d/2 - X)^2} = 2X \quad \text{(Equation 12)}$$

Figure 10:
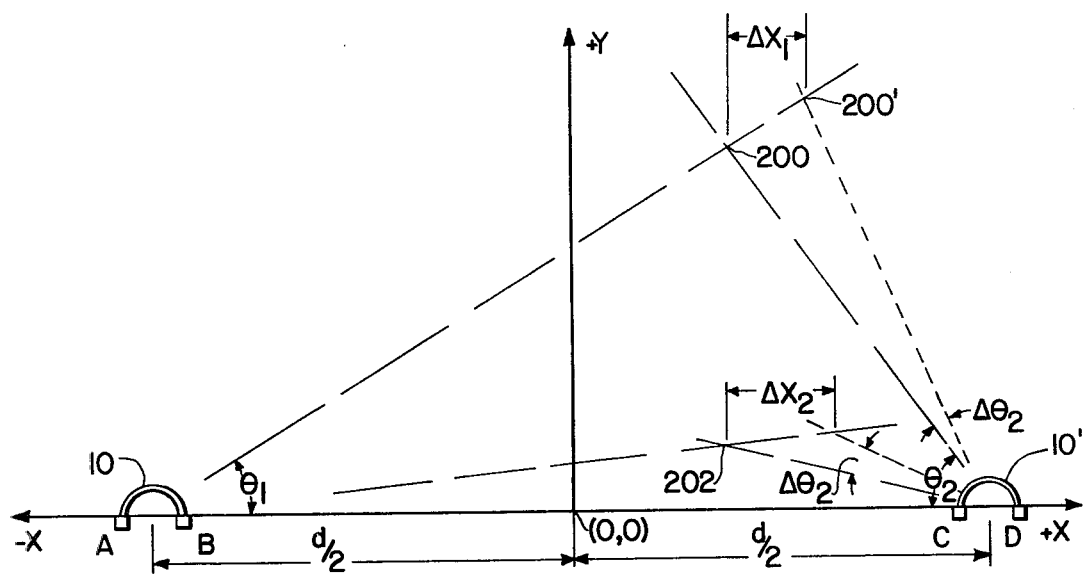
FIG. 10 shows the effect which errors in determining inclination angle of a point on the projectile trajectory relative to a reference line in a plane have on the calculated position of a point at which the trajectory intersects the plane.

Therefore, $$X \approx V_S \Delta t / 2 \quad \text{(Equation 13)}$$

Where $V_S$ is the velocity of sound in air within the target chamber, and $\Delta t$ is the difference in time of arrival of a detected vibration at transducers "B" and "C" in FIG. 10. While this method of calculating the "X" value for small values of "Y" would also have some errors, such as timing errors, velocity of sound value errors and errors due to the assumption of $Y << d/2$, it is useful if employed only in calculation of X,Y position coordinates for projectiles in the zone where these errors are less significant than those from the intersecting line calculation.

Figure 11:
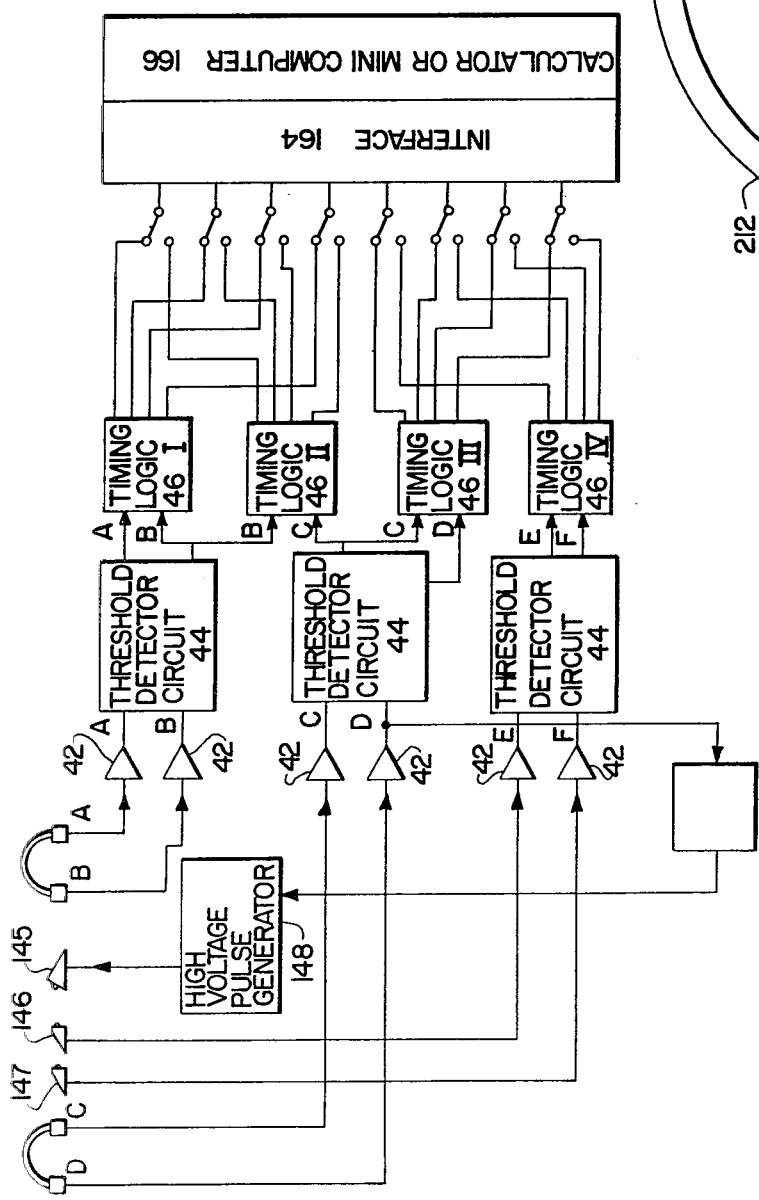
FIG. 11 shows a block diagram of a circuit for the target apparatus of FIG. 9.

FIG. 11 shows schematically a modified circuit arrangement for use with the target assembly of FIG. 9. The output signals from transducers "A", "B", "C,", and "D", are provided through respective amplifiers 42 to threshold detector circuits 44. As in FIG. 7, threshold detector outputs "A" and "B" are provided to one timing logic circuit 46 and threshold detector outputs "C" and "D" are provided to another timing logic circuit 46, as in FIG. 7. However, threshold detector outputs "B" and "C" are provided to a further timing logic circuit 46, which provides to interface 164 a binary signal indicating a number of clock pulses representing the time difference between threshold detector output signals "B" and "C", which is employed in calculator 166 for solving Equation 11 or Equation 13 when the "Y" shot position coordinate from the intersecting lines calculation is below a predetermined value.

Calculator 166 can be provided with an estimated or assumed value for the speed of sound propagation in air, or may be provided with information from which this value is calculated. For example, a value for the temperature of air in the target chamber may be automatically or manually fed to the calculator, as disclosed in Copending U.S. patent application Ser. No. 101,191, filed Dec. 7, 1979. Alternatively, and as described in copending application Ser. No. 101,191, an acoustic pulse source such as a spark gap device 145 connected to a high voltage pulse generator 148 is provided in the lower portion of the target chamber. The high voltage pulse generator is suitably triggered manually or automatically to produce a spark across the device 145 which results in an acoustic pulse detectable by additional transducers 146, 147. Transducers 146, 147 are coupled through respective amplifiers 42 and a further threshold detector circuit 44 to a further timing logic circuit 46. The actual speed of sound in air is thus readily calculated from the time difference between signals E and F and the known distance between transducers 146, 147.

For simplicity, such features as the clock 52, manual reset 50 and ready lamp 48 of FIG. 7 are not shown in FIG. 11. It will also be recognized that suitable modification to the calculator program of Appendix A is required for calculating speed of sound, for determining whether the calculated "Y" value is below a predetermined value, and for solving Equations 11 or 13 for "X". Such modifications can be readily effected by the skilled artisan with the aid of the foregoing description.

Operation of the modified logic circuit arrangement shown in FIG. 11 is as follows:
1. The operator observes "Ready" lamp lit and starts the program as already described.
2. The program loads values of the counters in logic blocks I and II, then halts.
3. The operator then switches over the multipole (8 pole) two-way switch, which connects logic blocks III and IV to interface 164, and then re-starts the program.
4. The program loads values of the counters in logic blocks III and IV, and then proceeds with the computation.

The above arrangement is very simple, but could readily be improved on by a skilled person without undue difficulty.

Figure 12:
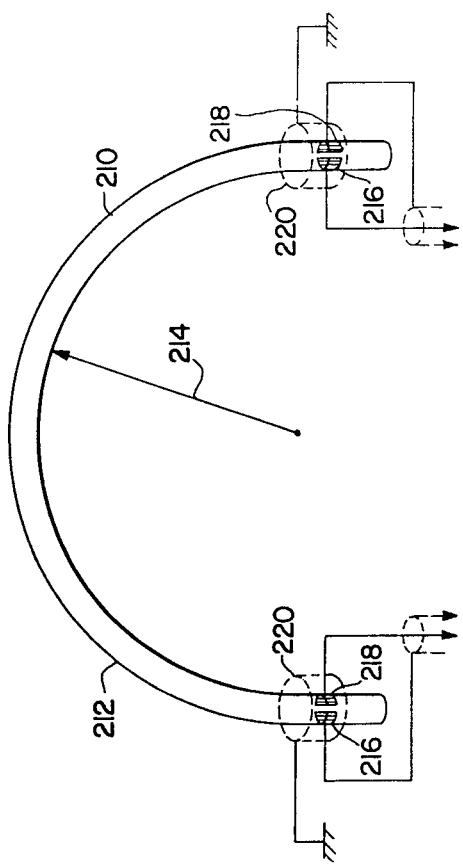
FIG. 12 shows a shock or pressure wave detector which is formed of piezoelectric ceramic material and which is provided with a pair of pickup electrodes at each end.

FIG. 12 shows an alternate construction of a shock or pressure wave detector assembly 210. Rather than having transducer elements 24 as in the embodiment of FIGS. 1 and 2, the assembly 210 of FIG. 12 comprises a curved bar 212 formed as a single piece of piezoelectric material, such as a ceramic material having piezoelectric properties. There are many potentially suitable piezoelectric materials however, a preferred choice would be that manufactured by Mullard Limited, Mullard House, Torrington Place, London, WC1E7HD under their commercial Type No. PXE5 which consists of a modified lead zirconate, titanate compound. The electrodes 216 and 218 of FIG. 12 may be formed in a variety of ways such as vacuum deposition of a metallic layer or coating with electrically conducting compounds such as "E-Solder" E-3021. Whilst it is well within the capability of one skilled in the art to fabricate sensors as described, various organisations such as Vernitron Limited, Thornhill, Southampton SO95QF, United Kingdom, would normally be used to undertake such work. For more information refer to the publication Piezoelectric Ceramics, published by Mullard Limited, ISBN 0 901232 75 0. Curved bar 212 preferably has a uniform circular cross-section and a uniform radius of curvature 214 over its length. At each end of the bar is affixed a pair of conductive pickup electrodes 216, 218 at appropriate points for picking up potential differences across the bar end. Metallic shielding 220 is provided around each pickup electrode pair. When a projectile-generated shock or pressure wave impinges tangentially on the outer surface of the piezoelectric bar, vibrations are induced in the bar which result in an output signal from each pickup electrode pair. The time difference between these output signals is employed in the same manner as the output signals of detector assembly 10 of FIGS. 1 and 2. Assembly 210 of FIG. 12 has a number of advantages, including the hardness and robustness of the single piece of ceramic material and the fact that the output signals would not be limited by acoustic mismatch between a variation transmitting bar and associated transducer elements. Further, it is expected that assembly 210 can be accurately and yet inexpensively produced in quantity. It is recognized, however, that detecting the time difference between output signals of assembly 210 may be more critical because of much faster propagation velocity of the vibrations in a ceramic bar than in an epoxy resin bar.

Figure 13:
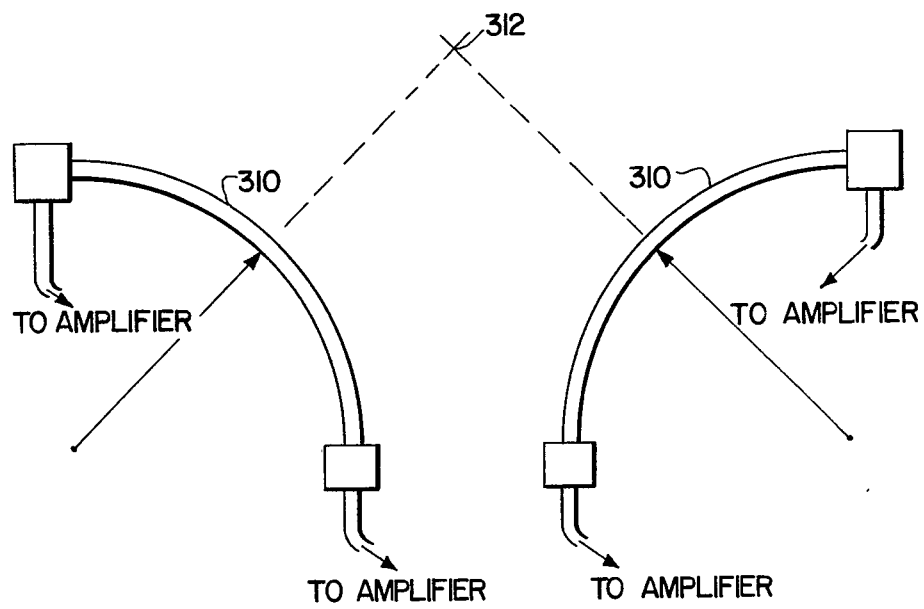
FIG. 13 shows an arrangement of shortened shock or pressure wave detectors.

The curved bar 12 or 212 of FIGS. 1 and 12, respectively, are shown having a constant radius of curvature enclosing an angle of about 180°. However, the enclosed angle may be reduced to nearer 90° if the curved bars are rotated about their center of curvature of 45°, with the "apex" of curvature pointing toward the "bull" 312 of the target, as shown in FIG. 13. Corresponding modification to the computer program sequence of Appendix "A" is needed to compensate for the slightly differing geometry of this configuration, which can be readily implemented by the skilled artisan.

Further modification of the described apparatus within the spirit and scope of the invention as defined in the following claims will be apparent to those of skill in the art.

APPENDIX "A"

Program for Hewlett-Packard Desk-Top Calculator type 9815A/S.

Program to Input and Calculate Trajectory Position for Two Curved-Bar Transducer System.

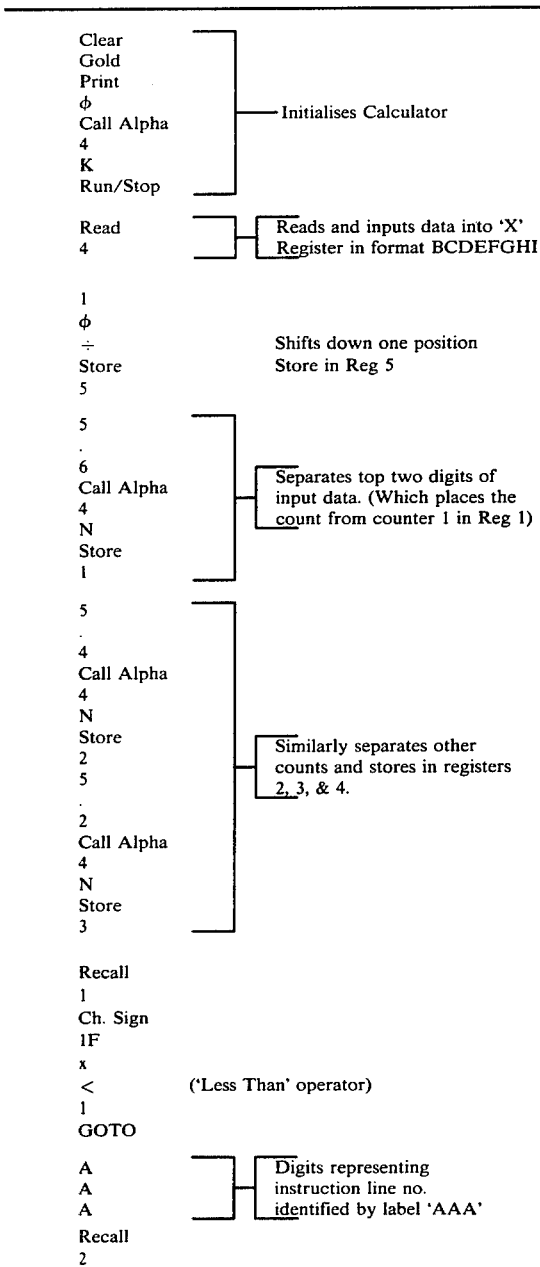

-continued

```
AAA  K₁  ⎫
     K₂  ⎪
     K₃  ⎬ Loads X reg. with values of
     K₄  ⎪ pre-determined parameter
     K₅  ⎪         90
     K₆  ⎪ equal to ── · T_C · V_p
     K₇  ⎭          π

Store
     φ
     Multiply
     Print        Prints value for θ1.
     Store
     1
     Recall
     3
     Ch. Sign
     IF
     x
     <            ('Less Than' operator)
     1
     GOTO
     B   ⎫
     B   ⎬ Digits representing
     B   ⎪ instruction line no.
         ⎭ identified by label 'BBB'.
BBB  Recall 4
     Recall
     φ
     Multiply
     Print        Prints value for θ2.
     Store
     3
     Recall
     1
     9
     φ
     X, Y Inter-
     change
     Minus
     Tan
     Store
     1
     Recall
     2
     9
     φ
     X, Y Inter-
     change
     Minus
     Tan
     Store
     2
     Recall
     1
     Recall
     2
     Minus
     Recall
     1
     Recall
     2
     Plus
     Divide
     L₁  ⎫
     L₂  ⎪
     L₃  ⎬ Enter pre-determined
     L₄  ⎪ value for D/2
     L₅  ⎪
     L₆  ⎪
     L₇  ⎭
     Store
     φ
     Multiply
     Print
     Store
     φ
     Multiply
     Print        Prints horizontal (X) co-ordi-
```

-continued

```
                  nates of intersection position
     Recall
     1
     Multiply
     Print        Prints vertical (Y) co-ordinates
                  of intersection position. Re-
                  turns to program start.
     GOTO
     φφφ
```

(ii) Program Operating Instructions (i) Ensure 'BCD' Interface Card, option 98133A is set to select code 4.

(ii) Put calculator mode switch to "RUN". Print switch to "NORM".

(iii) Press 'R/S' key.
Calculator will run briefly then halt. When the 'READY' lamp lights, indicating that a shot has been detected, press R/S again. Program will load counter contents and perform calculations described.

To reset counter for next shot, press 'RESET' switch (on logic circuits).

(iii) Wiring connections to 98133A interface card. Refer to Timing Logic Drawing, note that counter devices corresponding to CTR1A, CTR1B, CTR2A, CTR2B, in logic circuit for second sensor are designated as CTR3A, CTR3B, CTR4A, CTR4B respectively. Connections to 'XA2' connector described on page titled '98133A Circuit Diagrams' in Hewlett-Packard Handbook "Hewlett-Packard 9815A Calculator 98133ABCD Interface Operating and Service", Part No. 98133-90000.

| Pin Designation | | Connects To |
|---|---|---|
| B' | B18 | No Connection |
| 'A' Digit | B19 | No Connection |
| | B20 | No Connection |
| | B20 | B17 of same connector (GRND) |
| 'B' Digit | B25 | CTR1B, Pin 11 |
| | B24 | CTR1B, Pin 8 |
| | B23 | CTR1B, Pin 9 |
| | B22 | CTR1B, Pin 12 |
| 'C' Digit | A21 | CTR1B, Pin 11 |
| | A20 | CTR1B, Pin 8 |
| | A19 | CTR1B, Pin 9 |
| | A18 | CTR1B, Pin 12 |
| 'D' Digit | A22 | CTR2B, Pin 11 |
| | A23 | CTR2B, Pin 8 |
| | A24 | CTR2B, Pin 9 |
| | A25 | CTR2b, Pin 12 |
| 'E' Digit | B12 | CTR2A, Pin 11 |
| | B11 | CTR2A, Pin 8 |
| | B10 | CTR2A, Pin 9 |
| | B 9 | CTR2A, Pin 12 |
| 'F' Digit | B13 | CTR3B, Pin 11 |
| | B14 | CTR3B, Pin 8 |
| | B15 | CTR3B, Pin 9 |
| | B16 | CTR3B, Pin 12 |

-continued

| Pin Designation | | Connects To |
|---|---|---|
| 'G' Digit | B 4 | CTR3A, Pin 11 |
| | B 3 | CTR3A, Pin 8 |
| | B 2 | CTR3A, Pin 9 |
| | B 1 | CTR3A, Pin 12 |
| 'H' Digit | B 5 | CTR4B, Pin 11 |
| | B 6 | CTR4B, Pin 8 |
| | B 7 | CTR4B, Pin 9 |
| | B 8 | CTR4B, Pin 12 |
| 'I' Digit | A 4 | CTR4A, Pin 11 |
| | A 3 | CTR4A, Pin 8 |
| | A 2 | CTR4A, Pin 9 |
| | A 1 | CTR4A, Pin 12 |
| 'J' Digit | A 5 | A14 of Same Connector |
| | A 6 | A14 of Same Connector |
| | A 7 | A14 of Same Connector |
| | A 8 | A14 of Same Connector |
| | A14 | To Electrical Earth of Logic Circuits |
| | A15 | To Electrical Earth of Logic Circuits |
| | A16 | To Electrical Earth of Logic Circuits |
| | A17 | To Electrical Earth of Logic Circuits |
| | B17 | To Electrical Earth of Logic Circuits |
| | A30 | To Cable Shield |
| | B30 | To Cable Shield |

Note:
The described system is limited to a resolution of about 1° in determination of $\Theta_1$ and $\Theta_2$. This is not a fundamental restriction as the resolution could readily be increased by several adjustments, e.g., the use of a higher clock frequency for measuring $T_D$ together with more stages of counters.

I claim:

1. Apparatus for determining the inclination angle of the trajectory of a supersonic projectile through a predetermined plane relative to a predetermined point on a first reference line in the plane, comprising:
   first vibration transmitting means, having a surface defining an arc in the plane and having two ends, for transmitting vibrations caused by an airborne shock or pressure wave of the supersonic projectile;
   first and second means, operatively coupled to the respective ends of the first vibration transmitting means, for producing respective output signals in response to the transmitted vibrations;
   timing circuit means responsive to said output signals; for producing a first signal representing a time difference between the output signals of said first and second signal producing means; and
   computing means operative to calculate from the time difference signal the inclination angle of the supersonic projectile trajectory relative to the first reference line.

2. An apparatus according to claim 1, further comprising:
   second vibration transmitting means, having a surface defining an arc in the plane and having two ends, for transmitting vibrations caused by the airborne shock or pressure wave of the supersonic projectile to the two ends thereof; and
   third and fourth means operatively coupled to the respective ends of said second vibration transmitting means, for producing respective output signals in response to vibration of said second vibration transmitting means,
   said timing circuit means responsive to said third and fourth means for producing a second signal representing a time difference between the output signals of the third and fourth signal producing means, and
   said computing means being further operative to calculate from the second time difference signal the inclination of the supersonic projectile trajectory relative to a predetermined point on a second reference line in the plane.

3. An apparatus according to claim 2, wherein said computing means is provided with information as to the location of said predetermined point on the first reference line and the location of said predetermined point on the second reference line, said computing means being further operative to calculate the location of a point in the plane through which said trajectory passes.

4. An apparatus according to claims 2 or 3, wherein the first and second reference lines coincide.

5. An apparatus according to claims 1, 2, or 3, wherein said trajectory is substantially normal to the predetermined plane.

6. An apparatus according to claims 1, 2, or 3, wherein the supersonic projectile is a bullet, further comprising a visible target member substantially lying in a plane parallel to said predetermined plane.

7. An apparatus according to claims 1, 2, or 3, wherein each said vibration transmitting means comprises a curved, elongate member which propagates vibrations therethrough at a velocity greater than the velocity of shock or pressure wave propagation in air.

8. An apparatus according to claim 7, wherein each said vibration transmitting means comprises an elongate member of uniform circular cross-section which is curved to define an arc of constant radius along at least a central portion thereof.

9. An apparatus according to claim 7, wherein each said vibration transmitting means is formed of an epoxy resin material.

10. An apparatus according to claims 1, 2, or 3, wherein each said signal producing means comprises a piezoelectric element.

11. An apparatus according to claim 10, wherein each said signal producing means further comprises a metal housing having an exterior end wall surface secured to a represpective end of a said vibration transmitting means, a recess for receiving the piezoelectric element, and an interior end wall surface to which a first face of the piezoelectric element is secured.

12. An apparatus according to claim 11, further comprising a stub waveguide secured to a second face of the piezoelectric element for delaying the reflecting back to the piezoelectric element of vibrations which pass through the piezoelectric element.

13. An apparatus according to claim 12, wherein the stub waveguide comprises a member of ceramic material having no significant peizoelectric properties.

14. An apparatus according to claim 12, wherein the stub waveguide comprises a plurality of piezoelectric elements bonded together to form a stack.

15. An apparatus according to claim 7, wherein each said vibration transmitting means is formed of a piezoelectric ceramic material.

16. An apparatus according to claim 15, wherein each said signal producing means comprises a pair of conduc- -continued

| | | |
|---|---|---|
| AAA | $K_1$ $K_2$ $K_3$ $K_4$ $K_5$ $K_6$ $K_7$ | Loads X reg. with values of pre-determined parameter equal to $\frac{90}{\pi} \cdot T_C \cdot V_p$ |
| | Store $\phi$ Multiply Print Store 1 Recall 3 Ch. Sign IF x < 1 GOTO | Prints value for $\theta_1$. |
| | | ('Less Than' operator) |
| | B B B | Digits representing instruction line no. identified by label 'BBB'. |
| BBB | Recall 4 Recall $\phi$ Multiply Print Store 3 Recall 1 9 $\phi$ X, Y Interchange Minus Tan Store 1 Recall 2 9 $\phi$ X, Y Interchange Minus Tan Store 2 Recall 1 Recall 2 Minus Recall 1 Recall 2 Plus Divide | Prints value for $\theta_2$. |
| | $L_1$ $L_2$ $L_3$ $L_4$ $L_5$ $L_6$ $L_7$ | Enter pre-determined value for D/2 |
| | Store $\phi$ Multiply Print Store $\phi$ Multiply Print | Prints horizontal (X) co-ordinates of intersection position |
| | Recall 1 Multiply Print | Prints vertical (Y) co-ordinates of intersection position. Returns to program start. |
| | GOTO $\phi\phi\phi$ | |

(ii) Program Operating Instructions (i) Ensure 'BCD' Interface Card, option 98133A is set to select code 4.

(ii) Put calculator mode switch to "RUN". Print switch to "NORM".

(iii) Press 'R/S' key.
Calculator will run briefly then halt. When the 'READY' lamp lights, indicating that a shot has been detected, press R/S again. Program will load counter contents and perform calculations described.

To reset counter for next shot, press 'RESET' switch (on logic circuits).

(iii) Wiring connections to 98133A interface card. Refer to Timing Logic Drawing, note that counter devices corresponding to CTR1A, CTR1B, CTR2A, CTR2B, in logic circuit for second sensor are designated as CTR3A, CTR3B, CTR4A, CTR4B respectively. Connections to 'XA2' connector described on page titled '98133A Circuit Diagrams' in Hewlett-Packard Handbook "Hewlett-Packard 9815A Calculator 98133ABCD Interface Operating and Service", Part No. 98133-90000.

| Pin Designation | | Connects To |
|---|---|---|
| B' | B18 | No Connection |
| 'A' Digit | B19 | No Connection |
| | B20 | No Connection |
| | B20 | B17 of same connector (GRND) |
| 'B' Digit | B25 | CTR1B, Pin 11 |
| | B24 | CTR1B, Pin 8 |
| | B23 | CTR1B, Pin 9 |
| | B22 | CTR1B, Pin 12 |
| 'C' Digit | A21 | CTR1B, Pin 11 |
| | A20 | CTR1B, Pin 8 |
| | A19 | CTR1B, Pin 9 |
| | A18 | CTR1B, Pin 12 |
| 'D' Digit | A22 | CTR2B, Pin 11 |
| | A23 | CTR2B, Pin 8 |
| | A24 | CTR2B, Pin 9 |
| | A25 | CTR2b, Pin 12 |
| 'E' Digit | B12 | CTR2A, Pin 11 |
| | B11 | CTR2A, Pin 8 |
| | B10 | CTR2A, Pin 9 |
| | B 9 | CTR2A, Pin 12 |
| 'F' Digit | B13 | CTR3B, Pin 11 |
| | B14 | CTR3B, Pin 8 |
| | B15 | CTR3B, Pin 9 |
| | B16 | CTR3B, Pin 12 |

-continued

| Pin Designation | | Connects To |
|---|---|---|
| 'G' Digit | B̄ 4 | CTR3A, Pin 11 |
| | B 3 | CTR3A, Pin 8 |
| | B 2 | CTR3A, Pin 9 |
| | B 1 | CTR3A, Pin 12 |
| 'H' Digit | B̄ 5 | CTR4B, Pin 11 |
| | B 6 | CTR4B, Pin 8 |
| | B 7 | CTR4B, Pin 9 |
| | B 8 | CTR4B, Pin 12 |
| 'I' Digit | Ā 4 | CTR4A, Pin 11 |
| | A 3 | CTR4A, Pin 8 |
| | A 2 | CTR4A, Pin 9 |
| | A 1 | CTR4A, Pin 12 |
| 'J' Digit | Ā 5 | A14 of Same Connector |
| | A 6 | A14 of Same Connector |
| | A 7 | A14 of Same Connector |
| | A 8 | A14 of Same Connector |
| | A14 | To Electrical Earth of Logic Circuits |
| | A15 | To Electrical Earth of Logic Circuits |
| | A16 | To Electrical Earth of Logic Circuits |
| | A17 | To Electrical Earth of Logic Circuits |
| | B17 | To Electrical Earth of Logic Circuits |
| | A30 | To Cable Shield |
| | B30 | To Cable Shield |

Note:
The described system is limited to a resolution of about 1° in determination of $\Theta_1$ and $\Theta_2$. This is not a fundamental restriction as the resolution could readily be increased by several adjustments, e.g., the use of a higher clock frequency for measuring $T_D$ together with more stages of counters.

I claim:

1. Apparatus for determining the inclination angle of the trajectory of a supersonic projectile through a predetermined plane relative to a predetermined point on a first reference line in the plane, comprising:
   first vibration transmitting means, having a surface defining an arc in the plane and having two ends, for transmitting vibrations caused by an airborne shock or pressure wave of the supersonic projectile;
   first and second means, operatively coupled to the respective ends of the first vibration transmitting means, for producing respective output signals in response to the transmitted vibrations;
   timing circuit means responsive to said output signals; for producing a first signal representing a time difference between the output signals of said first and second signal producing means; and
   computing means operative to calculate from the time difference signal the inclination angle of the supersonic projectile trajectory relative to the first reference line.

2. An apparatus according to claim 1, further comprising:
   second vibration transmitting means, having a surface defining an arc in the plane and having two ends, for transmitting vibrations caused by the airborne shock or pressure wave of the supersonic projectile to the two ends thereof; and
   third and fourth means operatively coupled to the respective ends of said second vibration transmitting means, for producing respective output signals in response to vibration of said second vibration transmitting means,
   said timing circuit means responsive to said third and fourth means for producing a second signal representing a time difference between the output signals of the third and fourth signal producing means, and
   said computing means being further operative to calculate from the second time difference signal the inclination of the supersonic projectile trajectory relative to a predetermined point on a second reference line in the plane.

3. An apparatus according to claim 2, wherein said computing means is provided with information as to the location of said predetermined point on the first reference line and the location of said predetermined point on the second reference line, said computing means being further operative to calculate the location of a point in the plane through which said trajectory passes.

4. An apparatus according to claims 2 or 3, wherein the first and second reference lines coincide.

5. An apparatus according to claims 1, 2, or 3, wherein said trajectory is substantially normal to the predetermined plane.

6. An apparatus according to claims 1, 2, or 3, wherein the supersonic projectile is a bullet, further comprising a visible target member substantially lying in a plane parallel to said predetermined plane.

7. An apparatus according to claims 1, 2, or 3, wherein each said vibration transmitting means comprises a curved, elongate member which propagates vibrations therethrough at a velocity greater than the velocity of shock or pressure wave propagation in air.

8. An apparatus according to claim 7, wherein each said vibration transmitting means comprises an elongate member of uniform circular cross-section which is curved to define an arc of constant radius along at least a central portion thereof.

9. An apparatus according to claim 7, wherein each said vibration transmitting means is formed of an epoxy resin material.

10. An apparatus according to claims 1, 2, or 3, wherein each said signal producing means comprises a piezoelectric element.

11. An apparatus according to claim 10, wherein each said signal producing means further comprises a metal housing having an exterior end wall surface secured to a represpective end of a said vibration transmitting means, a recess for receiving the piezoelectric element, and an interior end wall surface to which a first face of the piezoelectric element is secured.

12. An apparatus according to claim 11, further comprising a stub waveguide secured to a second face of the piezoelectric element for delaying the reflecting back to the piezoelectric element of vibrations which pass through the piezoelectric element.

13. An apparatus according to claim 12, wherein the stub waveguide comprises a member of ceramic material having no significant peizoelectric properties.

14. An apparatus according to claim 12, wherein the stub waveguide comprises a plurality of piezoelectric elements bonded together to form a stack.

15. An apparatus according to claim 7, wherein each said vibration transmitting means is formed of a piezoelectric ceramic material.

16. An apparatus according to claim 15, wherein each said signal producing means comprises a pair of conduc- ...ive pickup electrodes affixed to an end of the elongate member of piezoelectric ceramic material, said pickup electrodes providing an output signal dependent upon electrical output of the piezoelectric ceramic material.

17. An apparatus according to claims 1, 2, or 3, further comprising an amplifier connected in series after each said signal producing means and before the timing circuit means.

18. An apparatus according to claims 1, 2, or 3, further comprising threshold detector circuit means connected in series after each said signal producing means and before the timing circuit means.

19. An apparatus according to claim 1, wherein the timing circuit means comprises a clock pulse generator, a first counter associated with said first signal producing means, and a second counter associated with said second signal producing means, the counters being operated in a manner such that when an output signal is generated by one of said first and second signal producing means the counter associated therewith counts pulses from the clock pulse generator until an output signal is generated by the other of said first and second signal producing means, whereby the number of said pulses counted represents the time difference between the output signals of said first and second signal producing means, 20. An apparatus according to claim 19, further comprising circuit means for resetting said counters.

21. An apparatus according to claim 20, further comprising means for indicating when said counters are reset.

22. An apparatus according to claims 2 or 3 wherein the timing circuit means comprises a clock pulse generator, and first, second, third, and fourth counters associated respectively with said first, second, third, and fourth signal producing means, said counters being being operated in a manner such that when an output signal is generated by one of said first and second signal producing means the counter associated therewith counts pulses from the clock pulse generator until an output signal is generated by the other of said first and second signal producing means and such that when an output signal is generated by one of said third and fourth signal producing means the counter associated therewith counts pulses from the clock pulse generator until an output signal is generated by the other of said third and fourth signal producing means.

23. An apparatus according to claim 22, further comprising circuit means for resetting said counters.

24. An apparatus according to claim 23, further comprising means for indicating when said counters are reset.

25. Apparatus for determining the location of a point on a reference plane through which the trajectory of a supersonic projectile passes, comprising:
   first and second vibration transmitting means located at respective spaced locations, each said virbration transmitting means having a surface defining an arc in the plane and having two ends, and each said vibration transmitting means transmitting vibrations caused by an airborne shock or pressure wave of the supersonic projectile to the two ends thereof;
   first and second signal producing means operatively coupled to the respective ends of said first vibration transmitting means and third and fourth signal producing means operatively coupled to the respective ends of said second vibration transmitting means, said first, second, third and fourth signal producing means generating respective output signals in response to the transmitted vibrations;
   timing circuit means responsive to said output signals for producing a first signal representing a time difference between the output signals of the first and second signal producing means and a second signal representing a time difference between the output signals of the third and fourth signal producing means; and
   computing means operative to calculate the location of said point on the reference plane through which the trajectory of the supersonic projectile passes, from the first and second time difference signals and from the locations of said first and second transmitting means.

26. An apparatus according to claim 25, wherein said trajectory is substantially normal to the reference plane.

27. An apparatus according to claim 25, wherein the supersonic projectile is a bullet, further comprising a visible target member substantially lying in a plane parallel to said reference plane.

28. An apparatus according to claim 25, wherein each said vibration transmitting means comprises a curved, elongate member which propagates vibrations therethrough at a velocity greater than the velocity of shock or pressure wave propagation in air.

29. An apparatus according to claim 28, wherein each said vibration transmitting means comprises an elongate member of uniform circular cross-section which is curved to define an arc of constant radius along at least a central portion thereof.

30. An apparatus according to claim 28, wherein each said vibration transmitting means is formed of an epoxy resin material.

31. An apparatus according to claim 25, wherein each signal producing means comprises a piezoelectric element.

32. An apparatus according to claim 31 wherein each said signal producing means further comprises a metal housing having an exterior end wall surface secured to a respective end of a said vibration transmitting means, a recess for receiving the piezoelectric element, and an interior end wall surface to which a first face of the piezoelectric element is secured.

33. An apparatus according to claim 32, further comprising a stub waveguide secured to a second face of the piezoelectric element for reflecting back to the piezoelectric element vibrations which pass through the piezoelectric element.

34. An apparatus according to claim 33, wherein the stub waveguide comprises a member of ceramic material having no significant piezoelectric properties.

35. An apparatus according to claim 33, wherein the stub waveguide comprises a plurality of piezoelectric elements bonded together to form a stack.

36. An apparatus according to claim 28, wherein each said vibration transmitting means is formed of a piezoelectric ceramic material.

37. An apparatus according to claim 36, wherein each said signal producing means comprises a pair of conductive pickup electrodes affixed to an end of the elongate member of piezoelectric ceramic material, said pickup electrodes providing an output signal dependent upon electrical output of the piezoelectric ceramic material.

38. An apparatus according to claim 25, further comprising an amplifier connected in series after each said signal producing means and before the timing circuit means.

39. An apparatus according to claim 25, further comprising threshold detector circuit means connected in series after each said signal producing means and before the timing circuit means.

40. An apparatus according to claim 25, wherein the timing circuit means comprises a clock pulse generator, and first, second, third, and fourth counters associated respectively with said first, second, third, and fourth signal producing means, said counters being operated in a manner such that when an output signal is generated by one of said first and second signal producing means the counter associated therewith counts pulses from the clock pulse generator until an output signal is generated by the other of said first and second signal producing means and such that when an output signal is generated by one of said third and fourth signal producing means the counter associated therewith counts pulses from the clock pulse generator until an output signal is generated by the other of said third and fourth signal producing means.

41. An apparatus according to claim 40, further comprising circuit means for resetting said counters.

42. An apparatus according to claim 41, further comprising means for indicating when said counters are reset.

43. Apparatus for determining the location of a point on a reference plane through which the trajectory of a projectile passes, comprising:
a framework;
at least one sheet of material, capable of being penetrated by a projectile, covering said framework to form a chamber and forming a target surface generally parallel to the reference plane;
first and second vibration transmitting means located at respective spaced locations within said chamber, each said vibration transmitting means having a surface defining an arc in the plane and having two ends, and each said vibration transmitting means transmitting to the two ends thereof vibrations caused by an airborne pressure wave of the supersonic projectile within said chamber;
first and second signal producing means operatively coupled to the respective ends of said first vibration transmitting means and third and fourth signal producing means operatively coupled to the respective ends of said second vibration transmitting means, said first, second, third, and fourth signal producing means generating respective output signals in response to the transmitted vibrations;
timing circuit means responsive to said output signals for producing a first signal representing a time difference between the output signals of the first and second signal producing means and a second signal representing a time difference between the output signals of the third and fourth signal producing means; and
computing means operative to calculate the location of said point on the reference plane through which the trajectory of the projectile passes, from the first and second time difference signals and from the locations of said first and second transmitting means.

44. An apparatus according to claim 43, wherein said trajectory is substantially normal to the reference plane.

45. An apparatus according to claim 43, wherein each said vibration transmitting means comprises a curved, elongate member which propagates vibrations therethrough at a velocity greater than the velocity of shock or pressure wave propagation in air.

46. An apparatus according to claim 45, wherein each said vibration transmitting means comprises an elongate member of uniform circular cross-section which is curved to define an arc of constant radius along at least a central portion thereof.

47. An apparatus according to claim 45, wherein each said vibration transmitting means is formed of an epoxy resin material.

48. An apparatus according to claim 43, wherein each said signal producing means comprises a piezoelectric element.

49. An apparatus according to claim 48, wherein each said signal producing means further comprises a metal housing having an exterior end wall surface secured to a respective end of a said vibration transmitting means, a recess for receiving the piezoelectric element, and an interior end wall surface to which a first face of the piezoelectric element is secured.

50. An apparatus according to claim 49 further comprising a stub waveguide secured to a second face of the piezoelectric element for reflecting back to the piezoelectric element vibrations which pass through the piezoelectric element.

51. An apparatus according to claim 50, wherein the stub waveguide comprises a member of ceramic material having no significant piezoelectric properties.

52. An apparatus according to claim 50, wherein the stub waveguide comprises a plurality of piezoelectric elements bonded together to form a stack.

53. An apparatus according to claim 47, wherein each said vibration transmitting means is formed of a piezoelectric ceramic material.

54. An apparatus according to claim 53, wherein each said signal producing means comprises a pair of conductive pickup electrodes affixed to an end of the elongate member of piezoelectric ceramic material, said pickup electrodes providing an output signal dependent upon electrical output of the piezoelectric ceramic material.

55. An apparatus according to claim 43, further comprising an amplifier connected in series after each said signal producing means and before the timing circuit means.

56. An apparatus according to claim 43, further comprising threshold detector circuit means connected in series after each said signal producing means and before the timing circuit means.

57. An apparatus according to claim 43, wherein the timing circuit means comprises a clock pulse generator, and first, second, third, and fourth counters associated respectively with said first, second, third, and fourth signal producing means, said counters being operated in a manner such that when an output signal is generated by one of said first and second signal producing means, the counter associated therewith counts pulses from the clock pulse generator until an output signal is generated by the other of said first and second signal producing means, and such that when an output signal is generated by one of said third and fourth signal producing means the counter associated therewith counts pulses from the clock pulse generator until an output signal is generated by the other of said third and fourth signal producing means.

58. An apparatus according to claim 43, wherein said first and second vibration transmitting means are located in respective lower corner regions of the chamber with the second and third signal producing means lying between said first and fourth signal producing means in a horizontal direction, wherein the timing circuit means is further responsive to said second and third output signals for producing a third signal representing a time difference between the output signals of the second and third signal producing means; and wherein the computing means is operative to (1) calculate from the first and second time difference signals the horizontal and vertical coordinates of said point on the reference plane relative to a known point, (2) determine whether the vertical coordinate of said point on the refernece plane lies below a predetermined threshold value and, if so, (3) recalculate the horizontal coordinate from the vertical coordinate, from the third signal producing means, and from a value representing the velocity of sound propagation in air.

59. An apparatus according to claim 58, further comprising means for supplying information to said computing means from which the velocity of sound propagation in air within said chamber may be calculated, said computing means being further operative to calculate said value representing the velocity of sound propagation in air from said information.

* * * * *